United States Patent [19]

Shimizu

[11] Patent Number: 5,518,339
[45] Date of Patent: May 21, 1996

[54] CABLE/PIPE SUSPENSION DEVICE AND LAYING APPARATUS

[75] Inventor: Shohachi Shimizu, Ogaki, Japan

[73] Assignee: Mirai Industries Co., Ltd., Gifu, Japan

[21] Appl. No.: 60,424

[22] Filed: May 11, 1993

[30] Foreign Application Priority Data

May 12, 1992 [JP] Japan .................................. 4-119325
Feb. 12, 1993 [JP] Japan .................................. 5-024426

[51] Int. Cl.⁶ .................................................. F16L 1/00
[52] U.S. Cl. .................. 405/154; 248/64; 254/134.3 FT; 405/303
[58] Field of Search .................................. 405/154, 169, 405/170, 303; 248/49, 64; 254/134.3 FT

[56] References Cited

U.S. PATENT DOCUMENTS

| | | | |
|---|---|---|---|
| 4,218,158 | 8/1980 | Tesson | 405/154 X |
| 4,667,782 | 5/1987 | Toase et al. | 248/64 X |
| 4,846,320 | 7/1989 | Clarke | 248/64 X |
| 4,981,395 | 1/1991 | Datin et al. | 405/154 |

Primary Examiner—Dennis L. Taylor
Attorney, Agent, or Firm—Lackenbach Siegel Marzullo Aronson & Greenspan

[57] ABSTRACT

A suspension device of this invention is used to carry a linear material over a cradle receiver and release the linear material onto the receiver, comprising a suspension means, a release means and an activation means. The suspension means suspends a linear material, the release means releases the linear material and the activation means activates the release means so that the suspended linear material can be released onto the cradle receiver. The device is particularly useful when the receiver is long and/or windingly. A laying apparatus of the invention chiefly comprises such suspension devices and a rail means prepared above a cradle receiver on which the suspension devices are to be movably held.

21 Claims, 48 Drawing Sheets

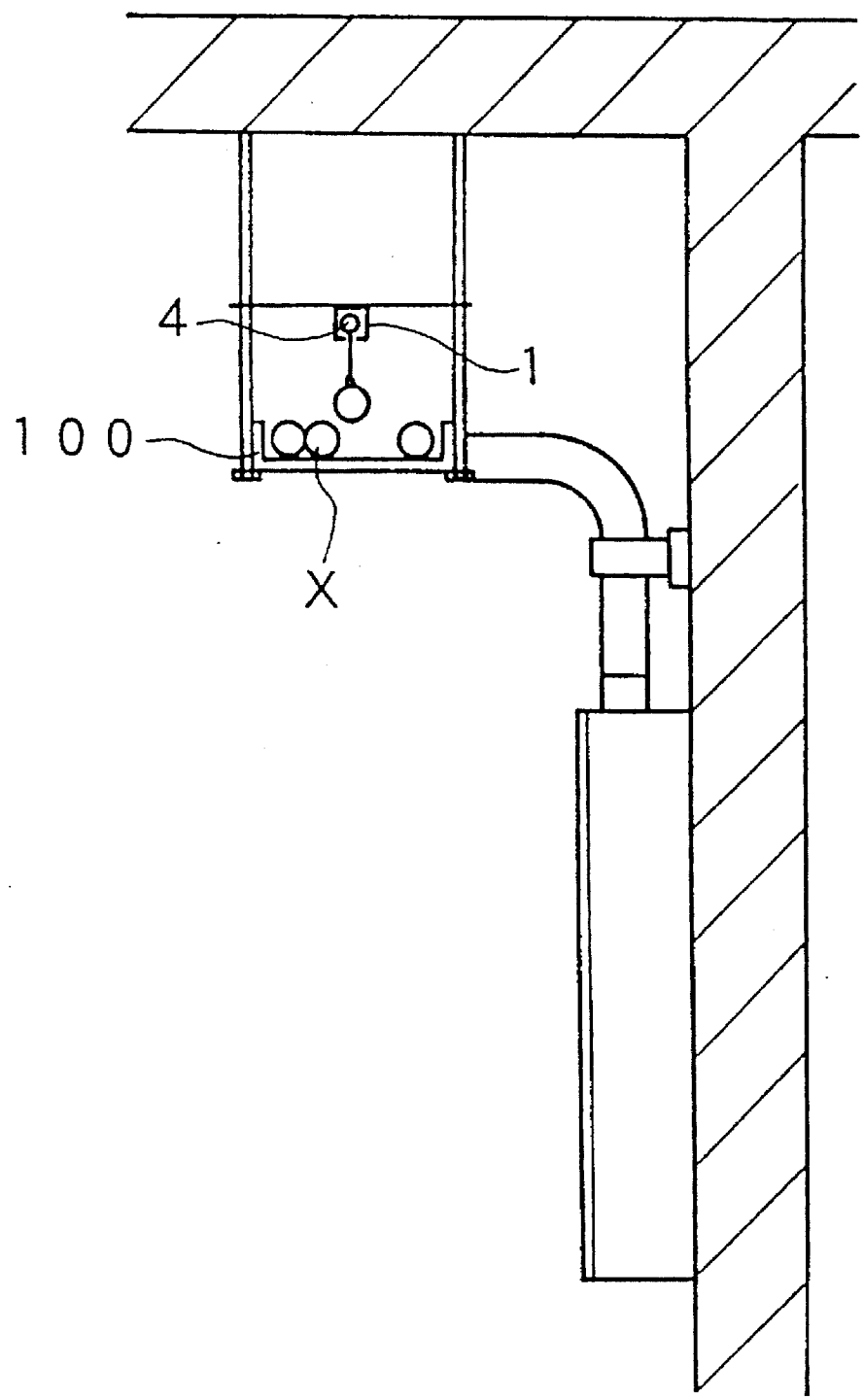
F I G. 2

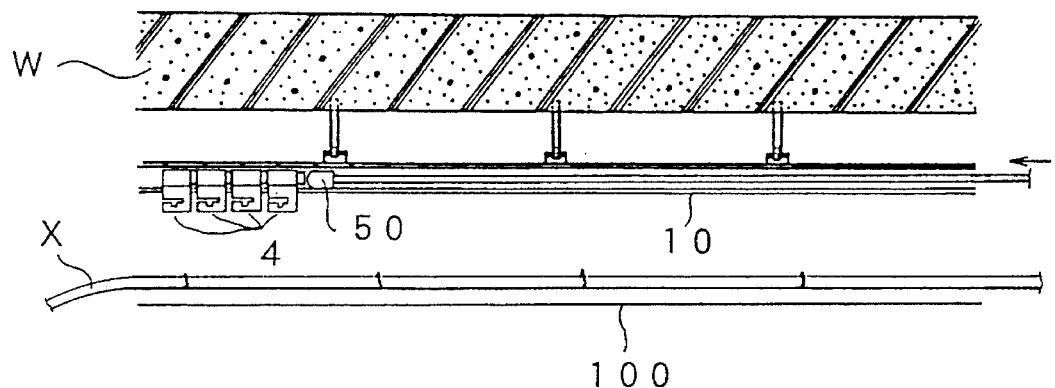
F I G. 60
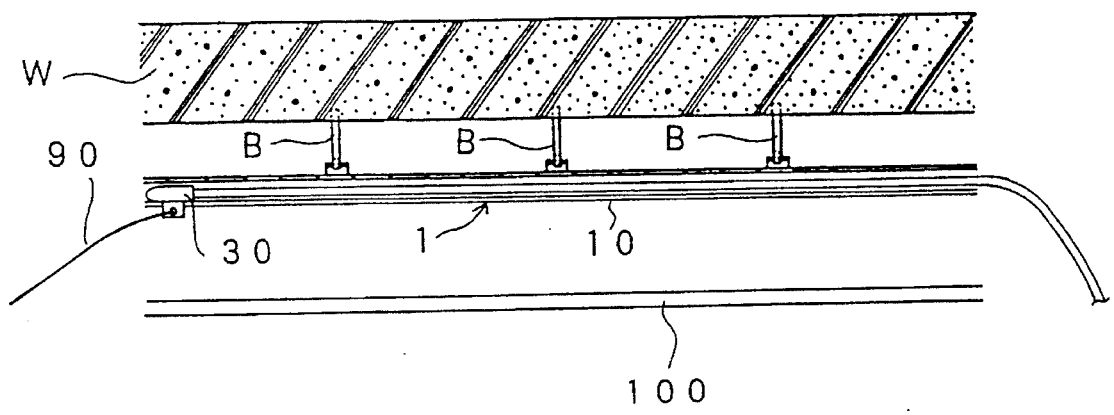
F I G. 61

CABLE/PIPE SUSPENSION DEVICE AND LAYING APPARATUS

BACKGROUND OF THE INVENTION

This invention relates to suspension devices to be used in a laying operation of various types of cables, wires and elastic pipes such as gas pipes and water pipes through a place such as a covered conduit or on a place such as a cable ladder prepared outdoors or inside a building such as a train station or a hospital, where varied types of water pipes, gas pipes, telephone cables, electric cables or wires and/or the like are to be newly laid or additionally laid. This invention also relates to laying apparatuses comprising such suspension devices.

This invention more particularly relates to suspension devices comprising a suspension means for suspending a cable, a wire or a pipe of various types and a release means for releasing said cable, wire or pipe from said suspension means, and this invention also relates to laying apparatuses comprising such suspension devices having a suspension means and a release means.

DESCRIPTION OF THE PRIOR ART

A cable is usually laid by workers on a cable ladder installed indoors or outdoors by carrying the cable over and along the cable ladder after pulling tip an end of the cable onto the ladder. Or a cable is often laid on a cable ladder by first laying a pilot rope on the cable ladder and pulling the pilot rope with a dragging machine or manually after connecting an end of the pilot rope with an end of the cable.

The former method of laying a cable on a cable ladder requires hard work arid is time consuming. A plurality of workers are needed for the operation and the work efficiency is rather poor. In addition, when there are cables previously laid on the cable ladder, these cables often become hindrance to additional cable laying operations.

The latter method of laying a cable on a cable ladder is not without a problem, either. This method increases the chances of damaging the cable to be laid since the cable to be laid is dragged on the cable ladder by force, especially when there are cables previously laid on the cable ladder, in which case the operation may also damage those existing cables.

Japanese Patent Unexamined Publication Nos. 63-144707 (Applicants: Seki Denko Co., Ltd. and Blest Kogyo Research Center), 61-23182 and 63-18911 disclose apparatuses for laying cables on cable ladders. These apparatuses require complicated component devices and their installation and removal after operations require strenuous work.

The inventor of the present invention disclosed methods and apparatuses for more efficiently and effectively laying cables in U.S. Pat. No. 5,173,010. Said invention provides a simplified cable laying operation. According to that invention, however, cables are laid on cable ladders by directly dragging the cables into the ladders.

The inventor also disclosed in Japanese Patent Unexamined Publication No. 4-271215 published Sep. 28, 1992 other methods and apparatuses for suspendedly laying cables throughout the cable laying route, in which no cable receivers, such as cable ladders, are used, nor are any cable release means.

Taking the prior art such as described above into consideration, the inventor has arrived at the present invention, which provides a simplified and easy cable (pipe) laying operation, eliminating the problem of getting hindered by the cables existing through the cable route. The present invention also provides a smooth cable laying operation over a long span cable route as well as through a winding cable route without damaging cables to be laid or already laid in the cable route.

SUMMARY OF THE INVENTION

A suspension device according to the present invention moves along a rail means prepared in a cable route, comprising a suspension means to suspend a cable, a release means to release the cable suspended by the suspension means, and an activation means to activate the release means.

The release means of the suspension device releases the suspended cable onto the cable receiving means when activated by the activation means of the suspension device.

A plurality of such suspension devices cooperatively suspend a cable by their suspension means and travel in the cable route along the rail means facilitating a smooth cable laying operation, especially when the cable is to be laid in addition to the cables already existing in the cable route. The use of such suspension devices also facilitates a smooth laying of a cable over a long span and through a winding cable route. There is substantially no fear of damaging the cable to be additionally laid or the cables previously laid in the route.

A cable laying apparatus according to the present invention comprises a rail means to be prepared above a cable receiving means, a plurality of suspension devices comprising as described above, a dragging device to introduce a cable and the suspension devices along the rail means through the cable route and a trigger means to trigger said activation means of the suspension devices to release the cable from the suspension devices onto the receiver in the cable route.

The dragging device of the above apparatus draws said suspension devices and the cable along the rail means until the head portion of the cable comes out of the cable route at the other end. The trigger means of the apparatus triggers the activation means of the suspension devices one by one, which eventually activates the release means of all the suspension devices on the rail means and releases the cable onto the receiving means. There is substantially no fear of damaging the cable to be newly laid or the cables previously laid in the cable receiving means below.

Another laying apparatus according to the present invention comprises a rail means to be prepared above a cable receiving means and a plurality of suspension devices comprising as described above, which is a modified version of the laying apparatus described directly above. The release means of each suspension device of this apparatus is activated by the activation means of each suspension device, which is to be manually operated.

Accordingly it is an object of the present invention to provide a suspension device, a plurality of which are capable of suspending a long cable over a cable receiving means, which travels along a rail means prepared above the cable receiving means along the cable route and is capable of releasing the cable onto the cable receiving means so that the cable can be smoothly laid on the cable receiving means without suffering damage thereto, especially when the cable is to be laid in addition to the cables previously laid on the cable receiving means.

It is another object of the present invention to provide a cable laying apparatus comprising suspension devices of the present invention, which facilitates a smooth cable laying operation, even through a long span winding cable route, without damaging the cable to be laid or the cables previously laid through the cable route.

BRIEF DESCRIPTION OF THE DRAWINGS

These and other objects and advantages of the present invention will become apparent by referring to the following detailed description and accompanying drawings, in which:

FIG. 2 is a front view slowing a use of a suspension device on a rain means prepared above a cable ladder according to the present invention;

Figure 13:
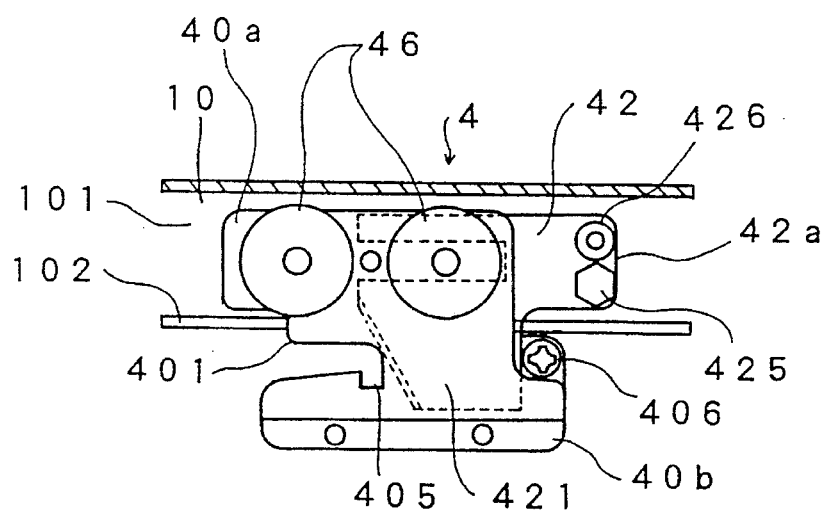
FIG. 13 a side view of another embodiment suspension device according to the present invention (Embodiment D-4)
Figure 15:
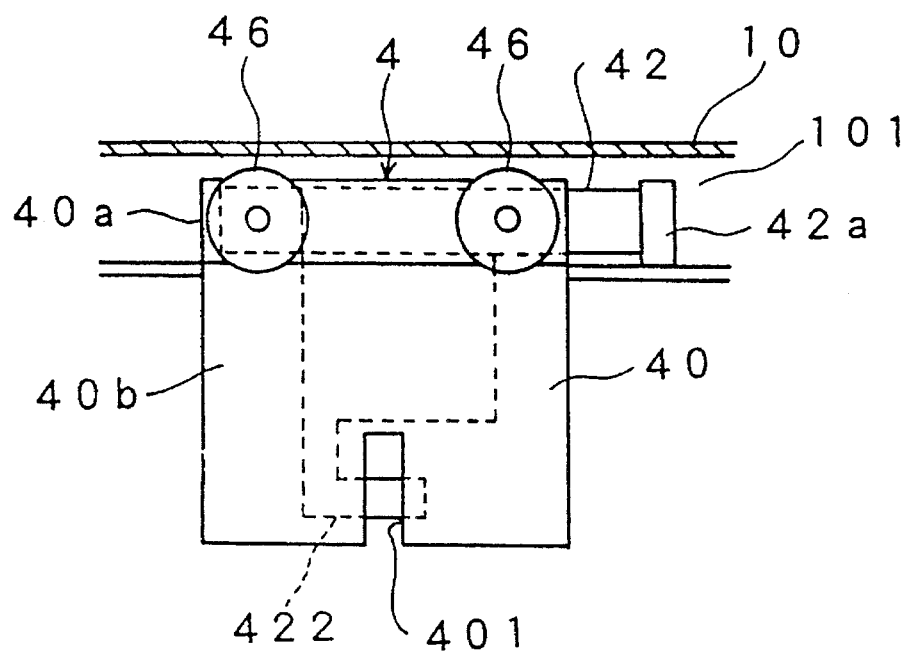
Figure 16:
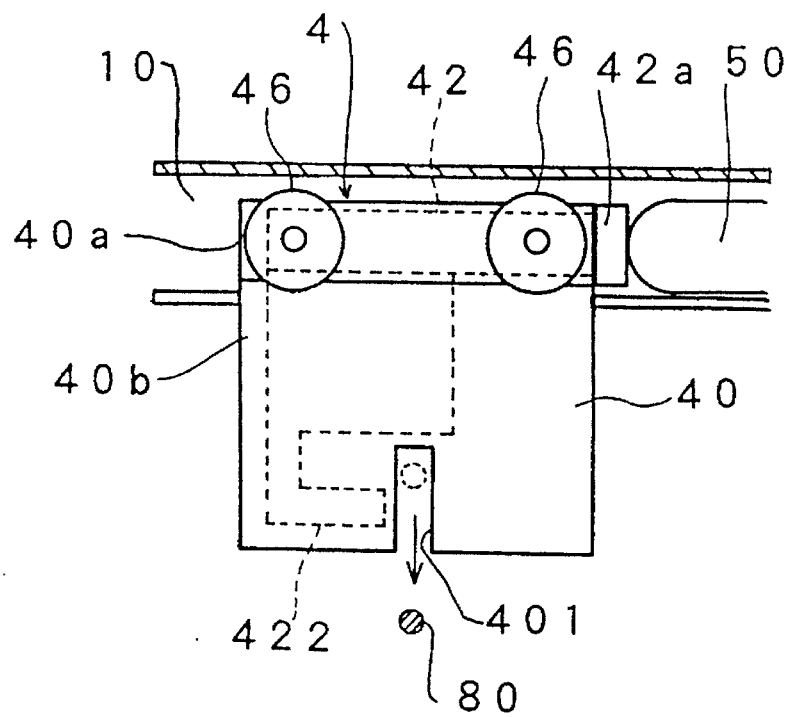
Figure 17:
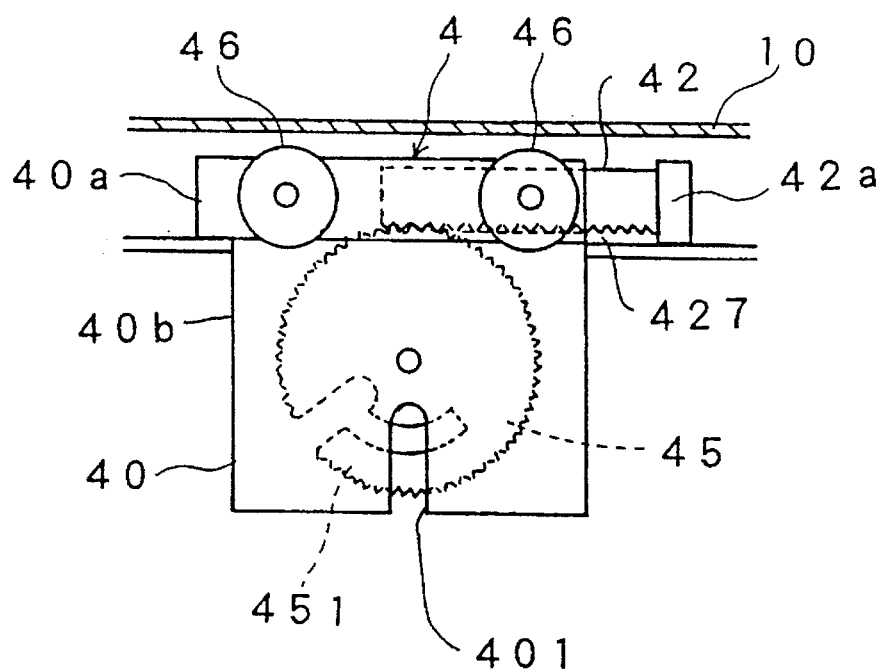
Figure 18:
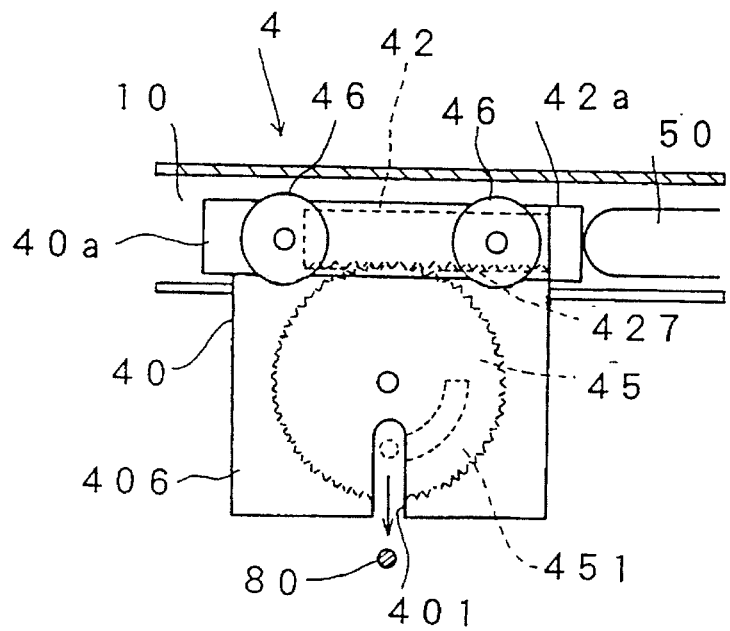
Figure 19:
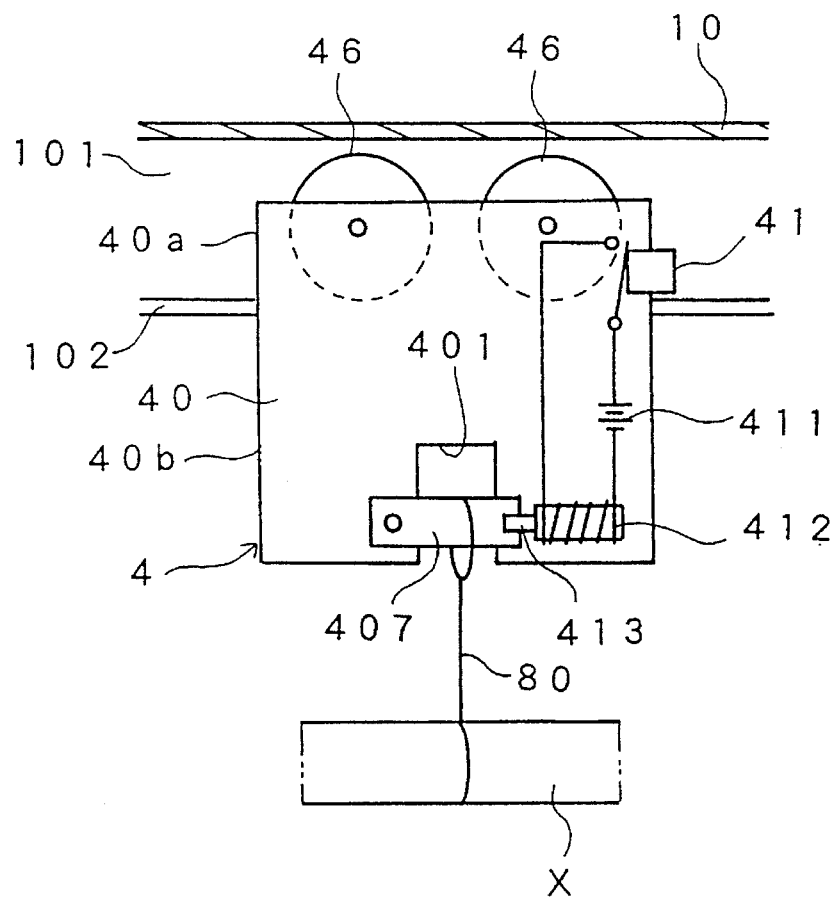
Figure 20:
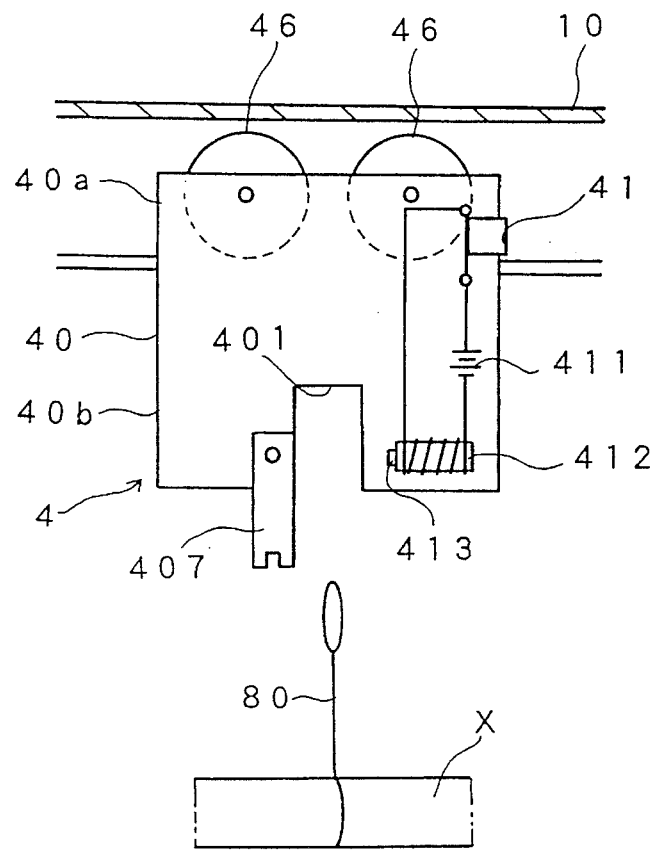
Figure 21:
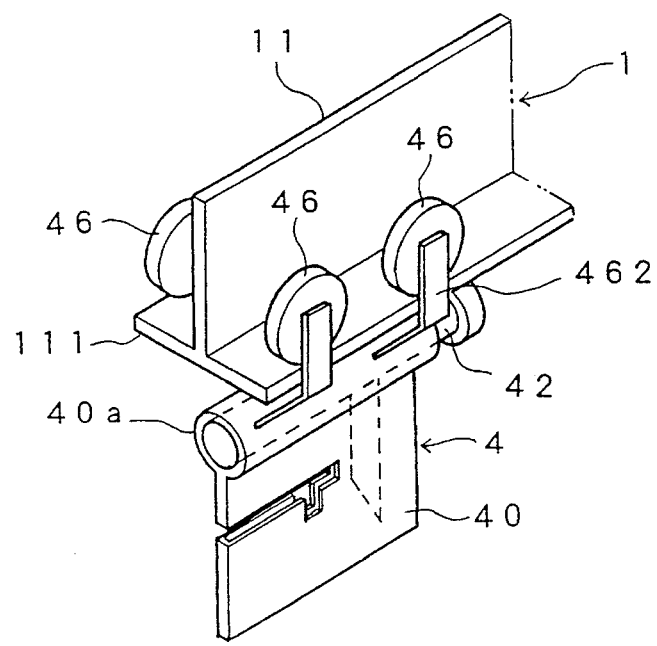
Figure 22:
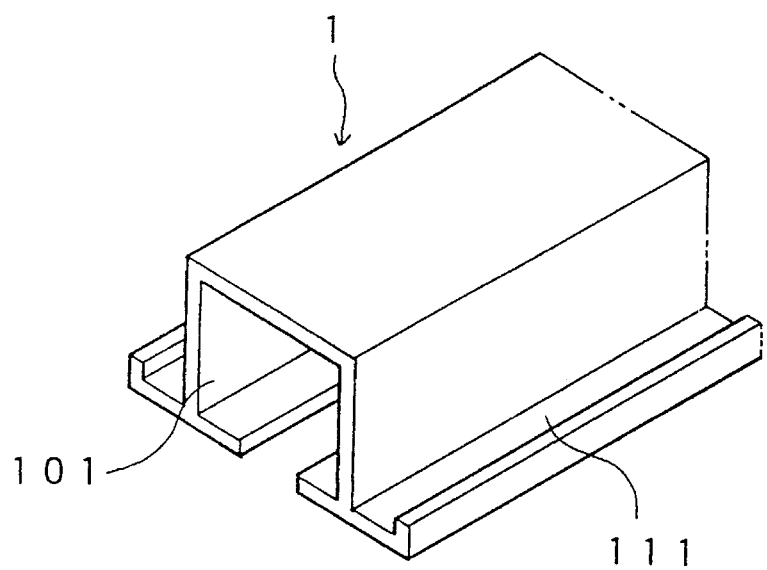
Figure 23:
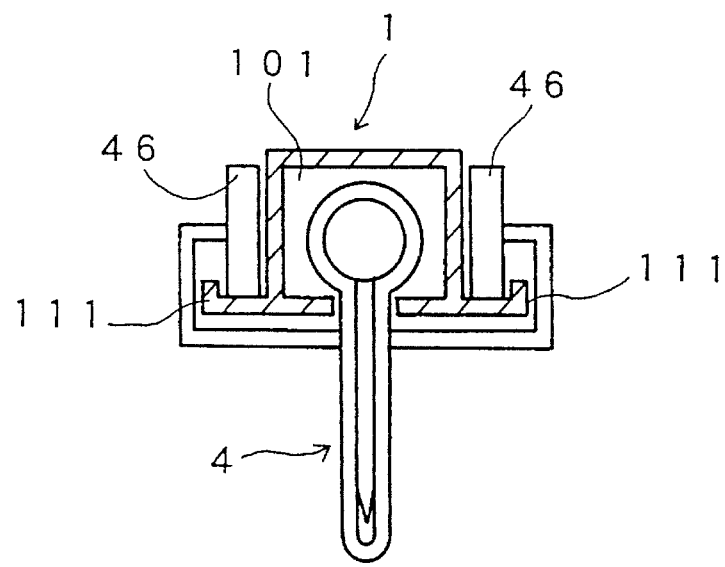
Figure 24:
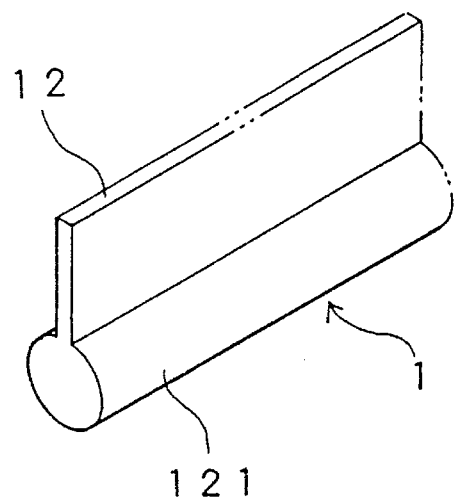
Figure 25:
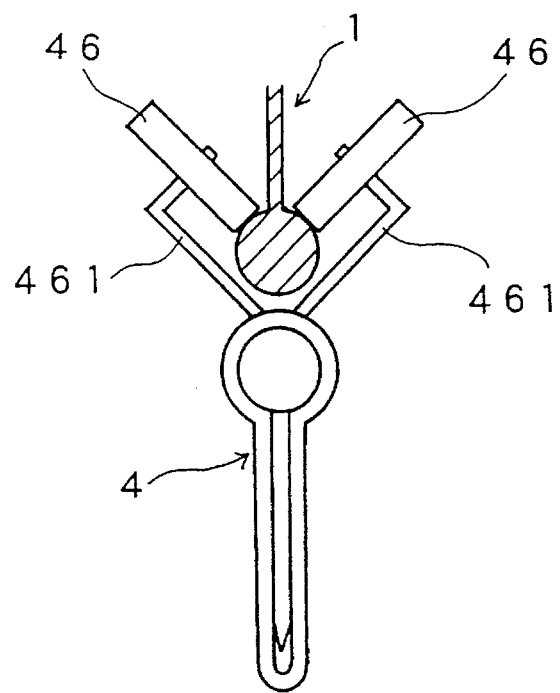
Figure 26:
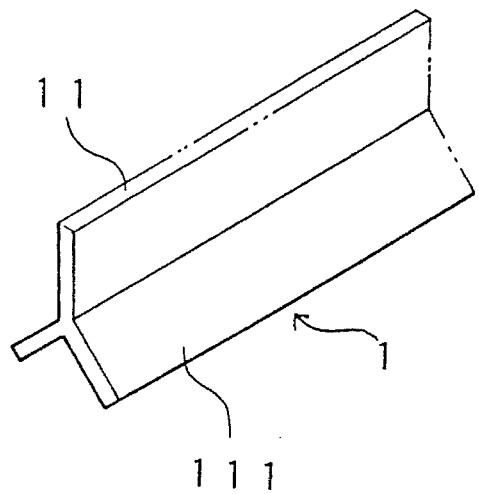
Figure 27:
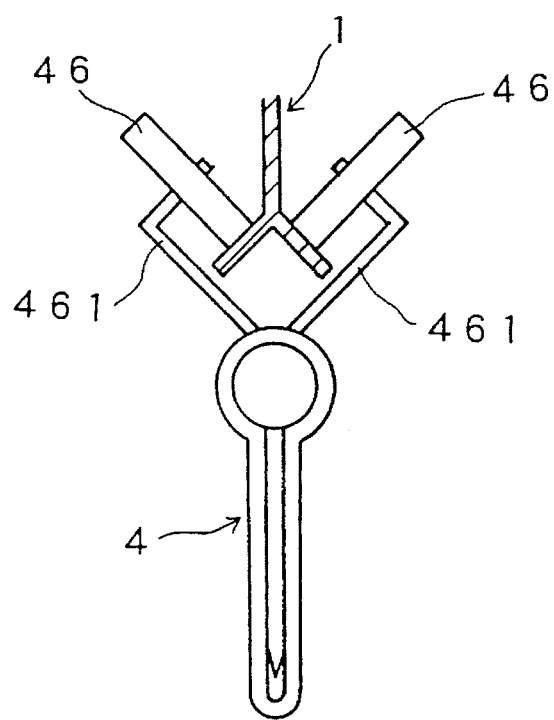
Figure 28:
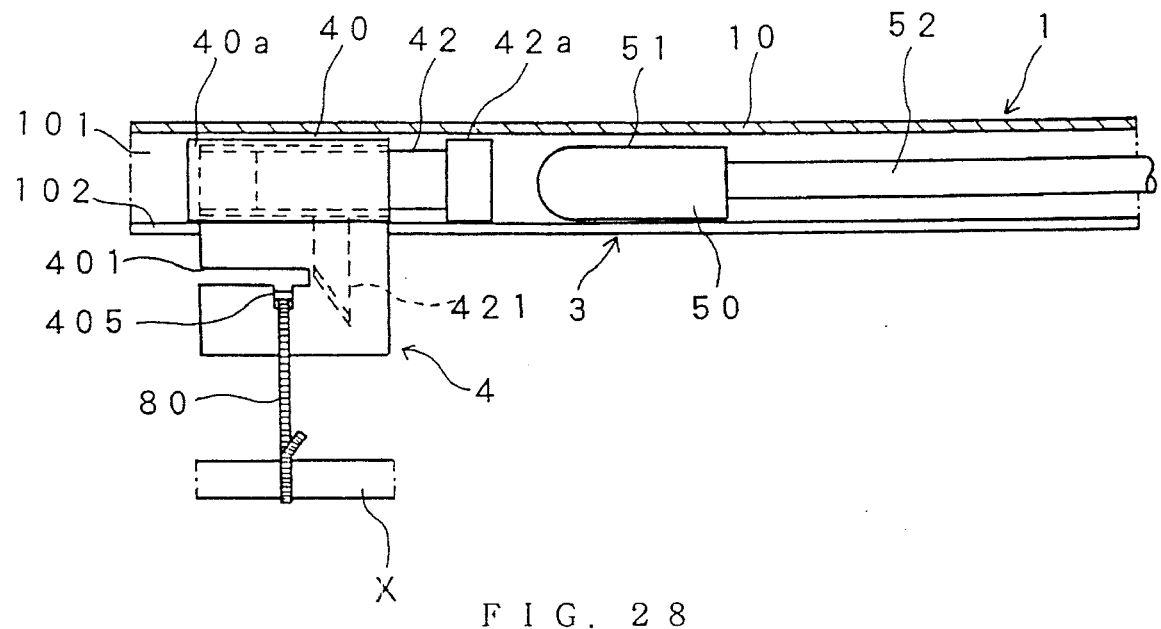
Figure 29:
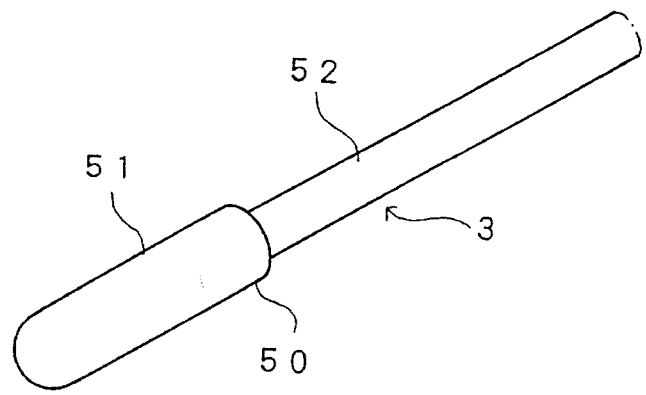
Figure 30:
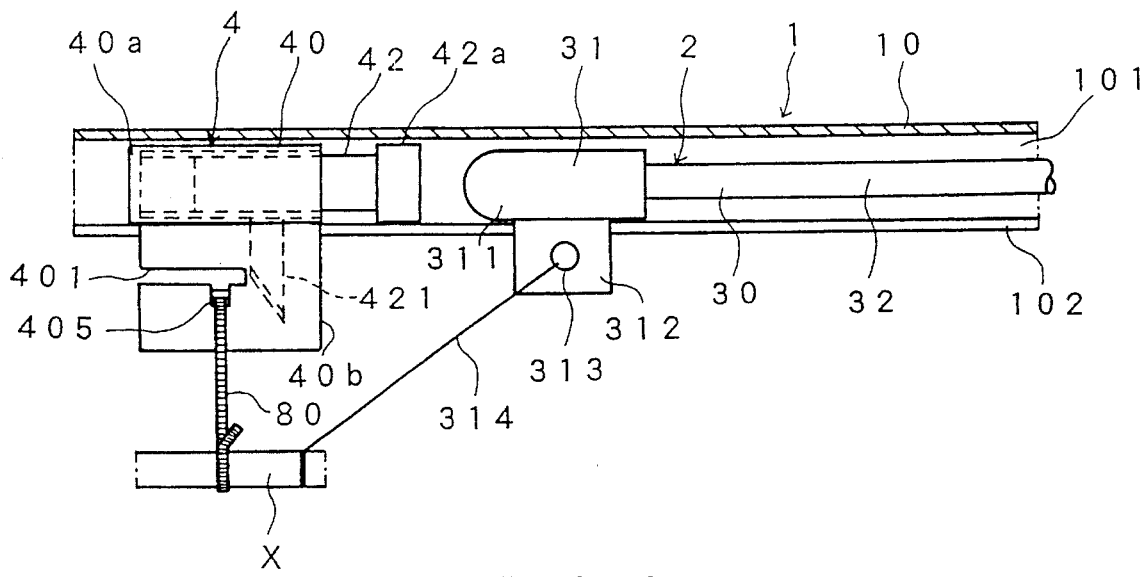
Figure 31:
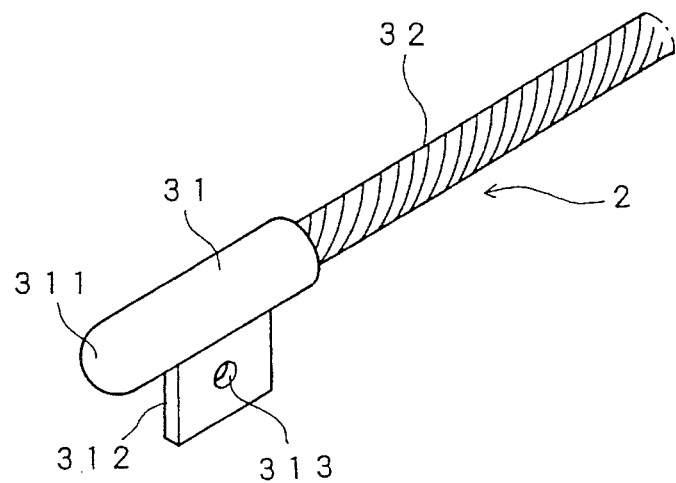
Figure 32:
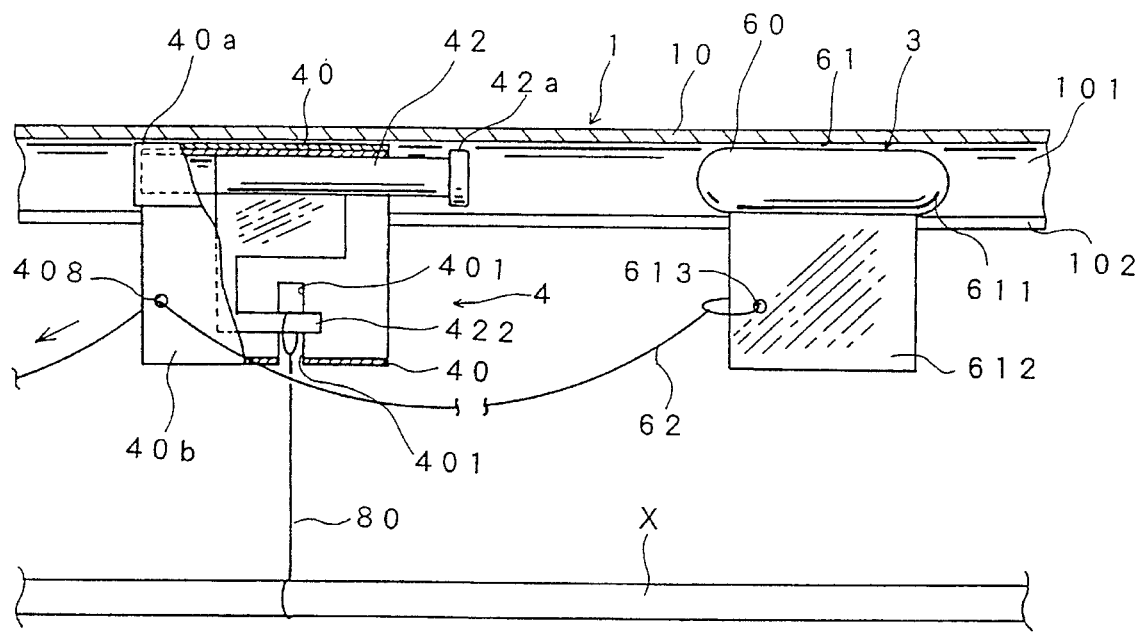
Figure 33:
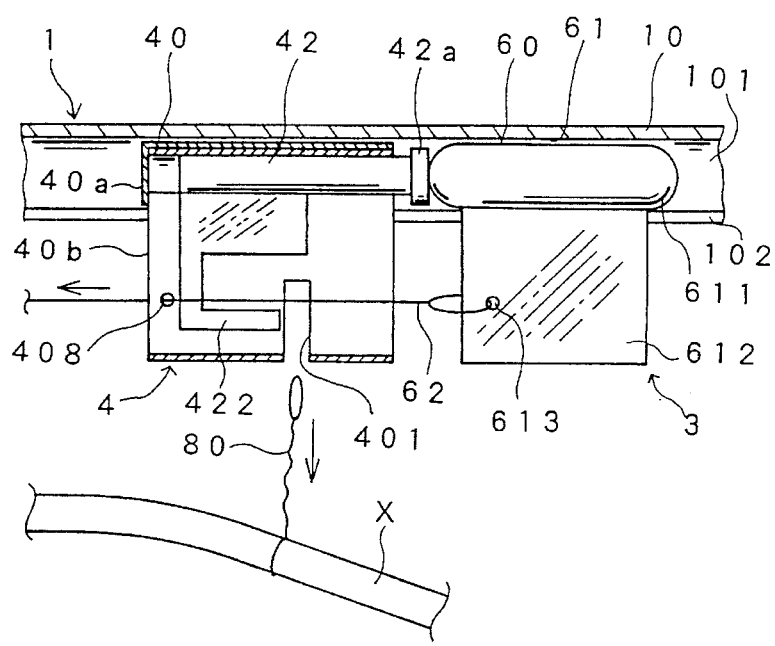
Figure 34:
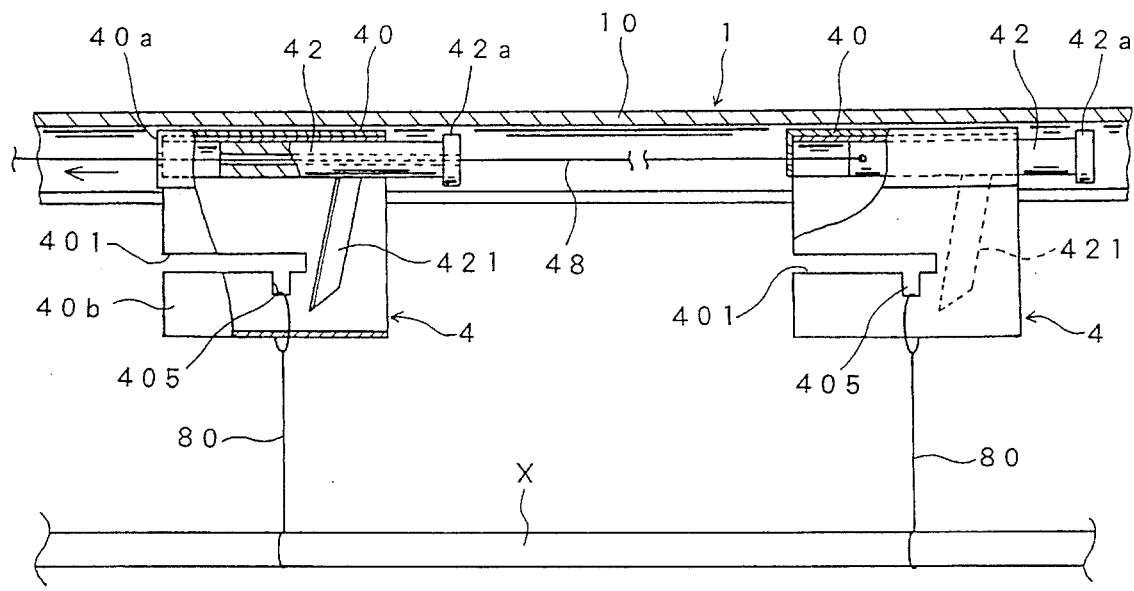
Figure 35:
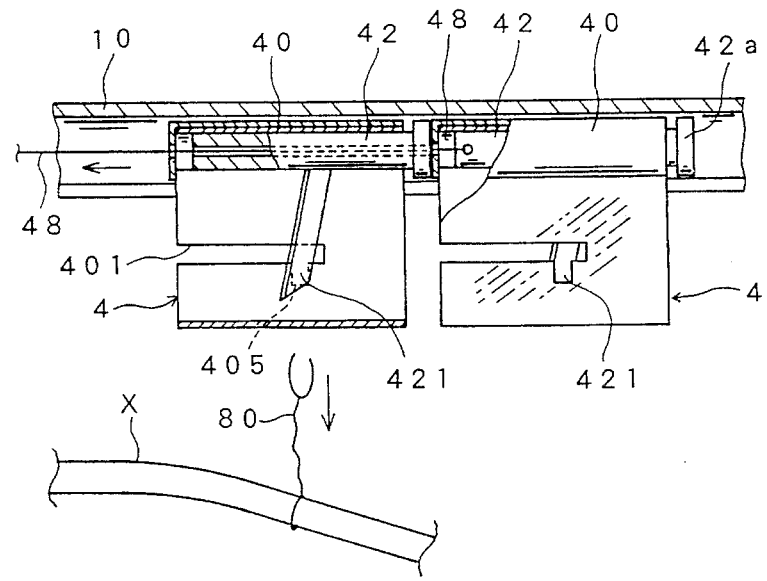
Figure 36:
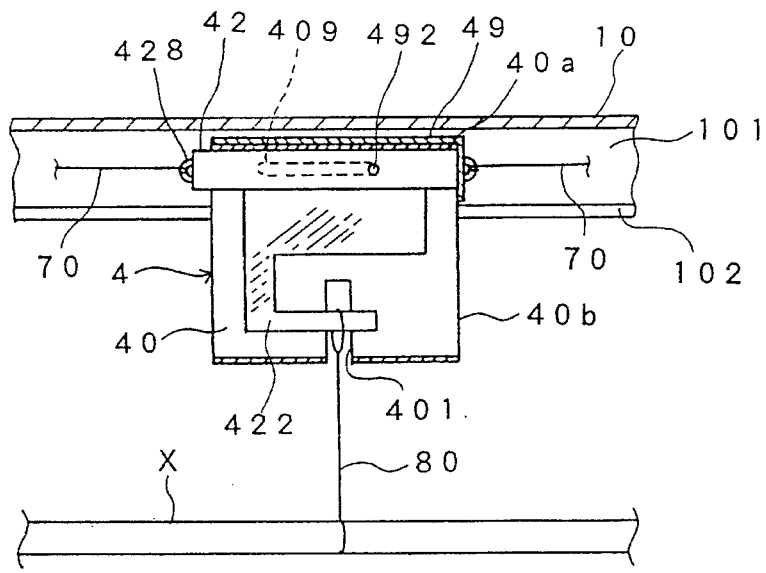
Figure 37:
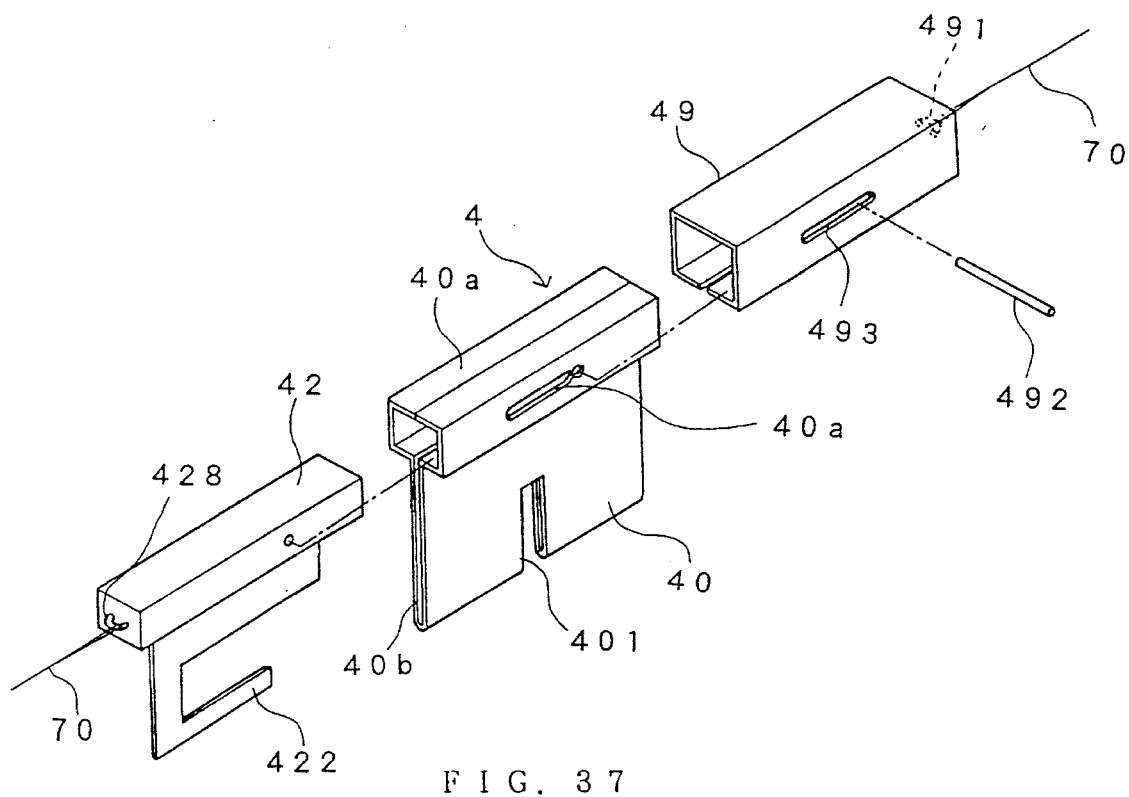
Figure 38:
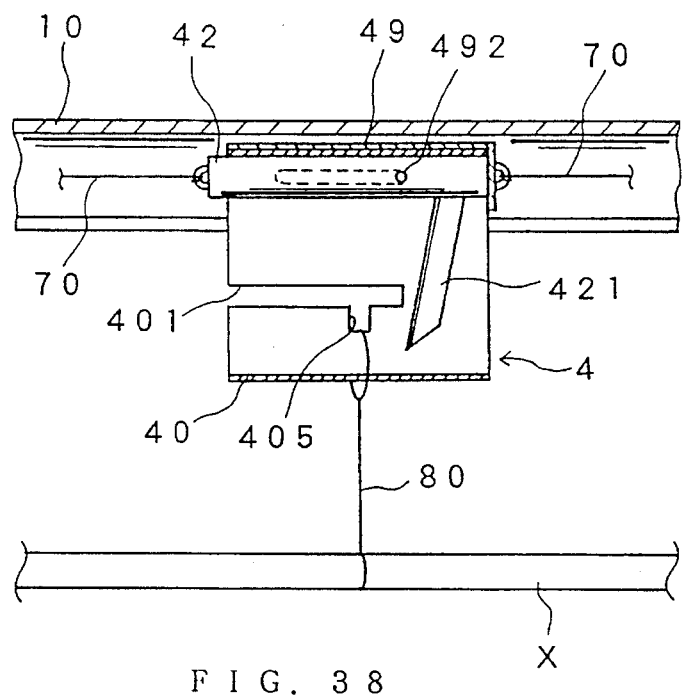
Figure 39:
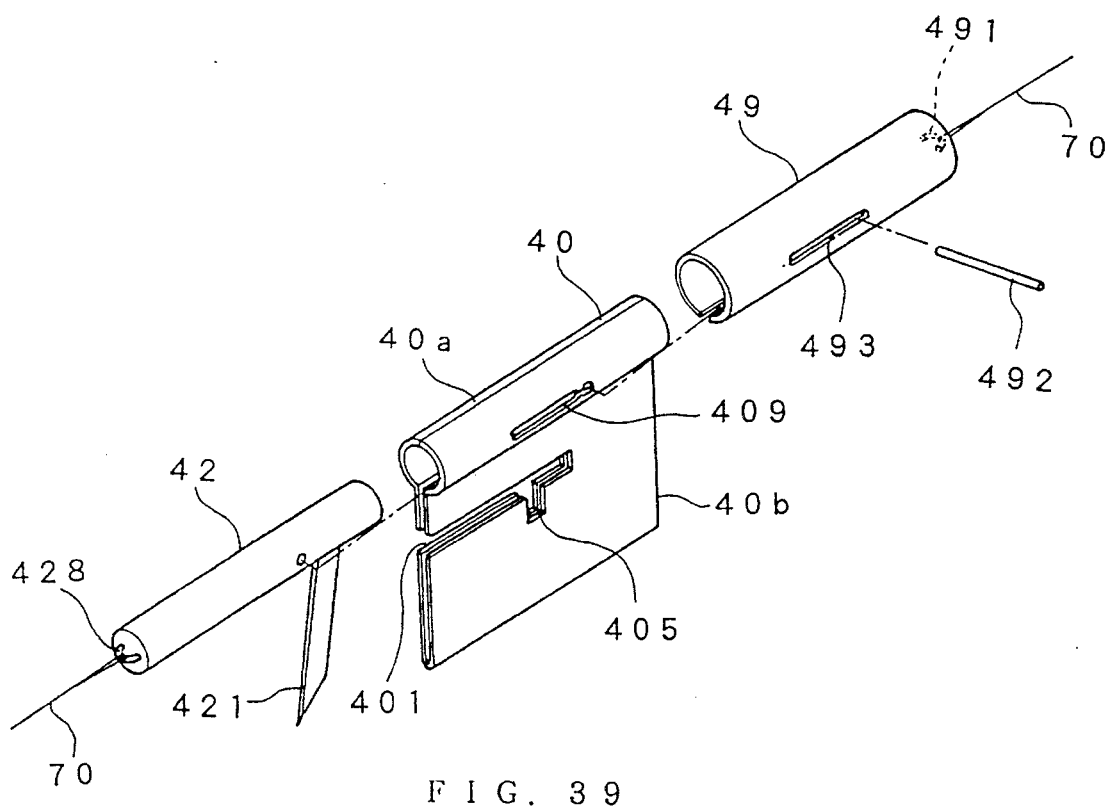
Figure 40:
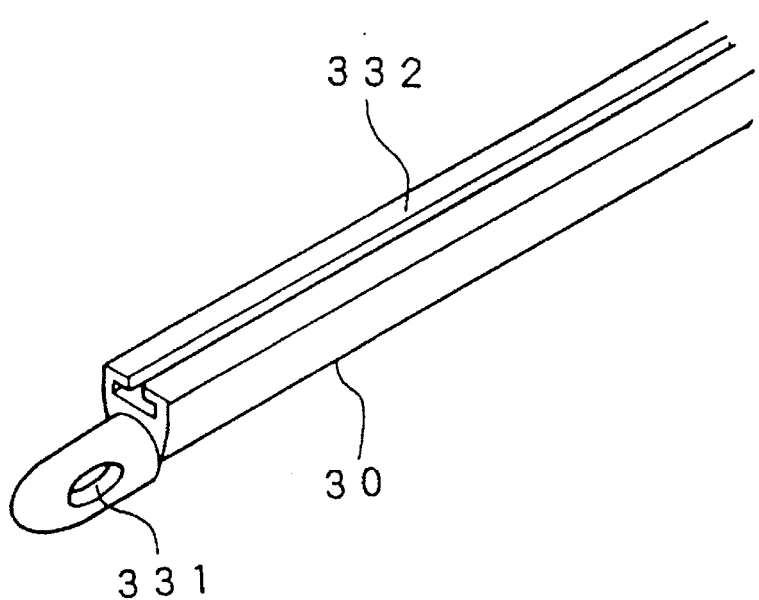
Figure 41:
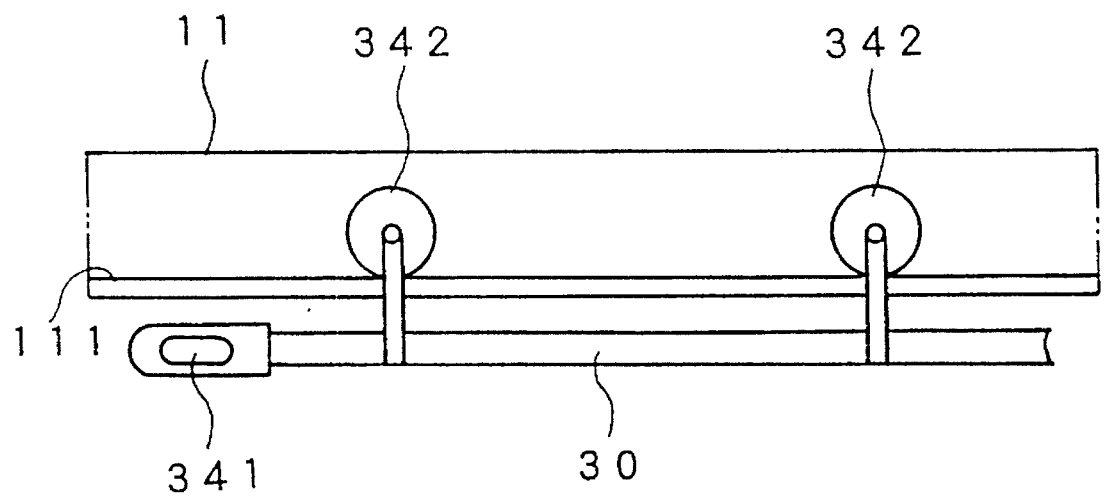
Figure 42:
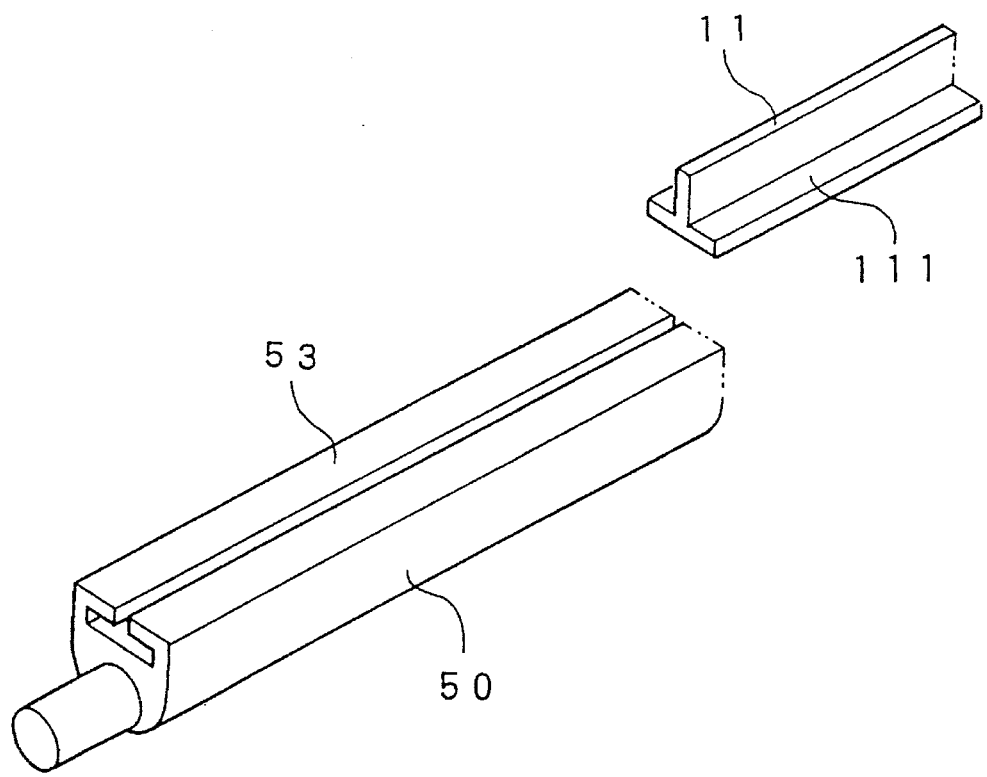
Figure 43:
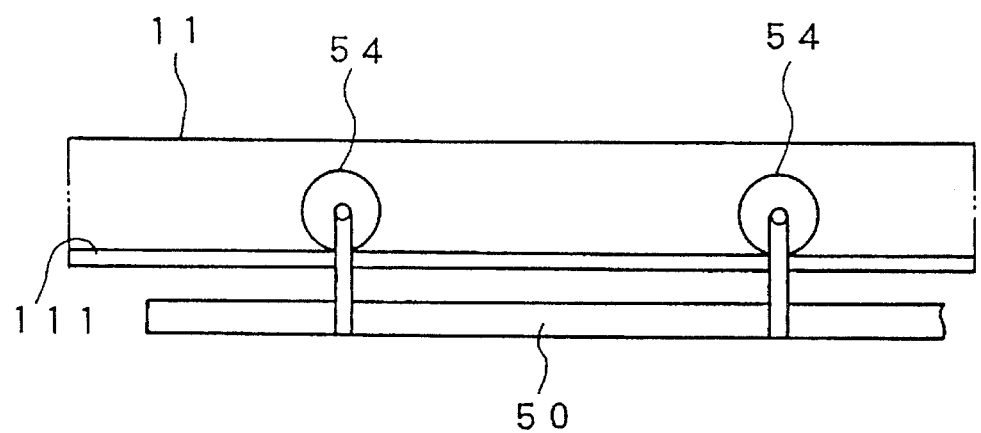
Figure 44:
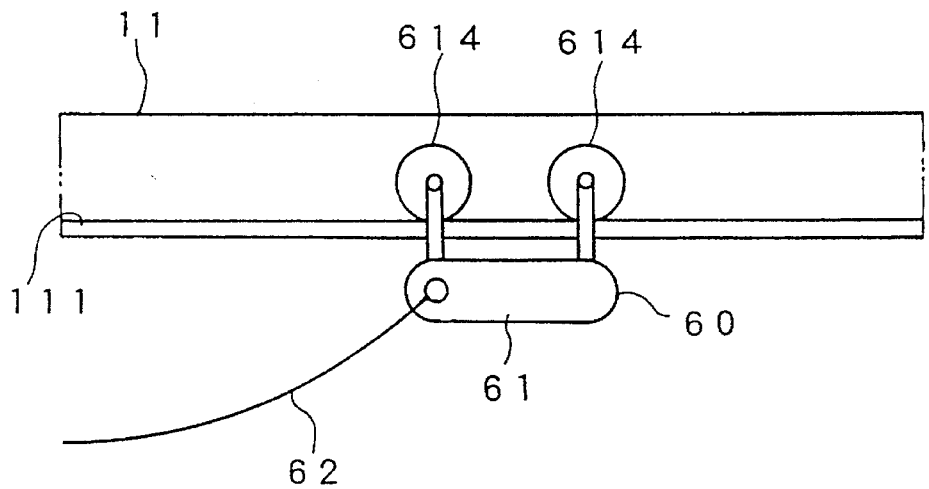
Figure 45:
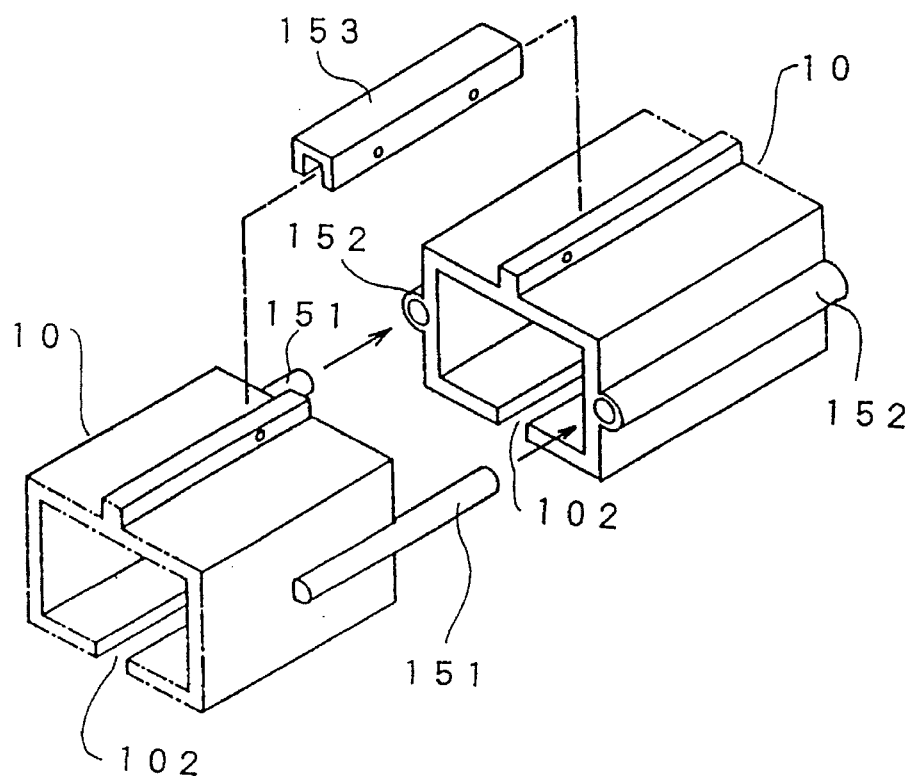
Figure 46:
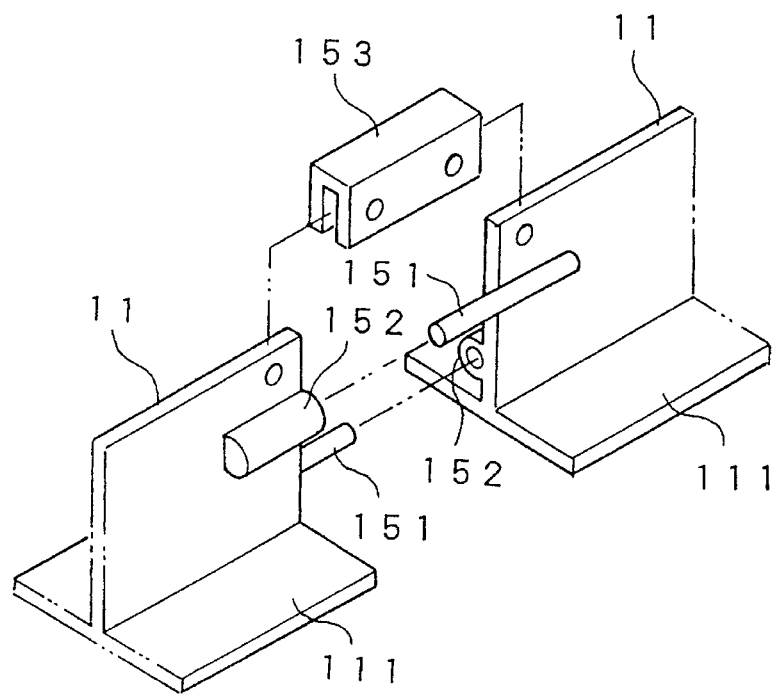
Figure 47:
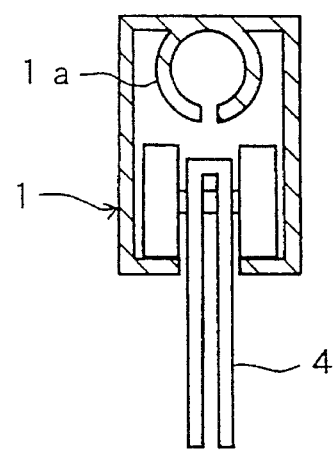
Figure 48:
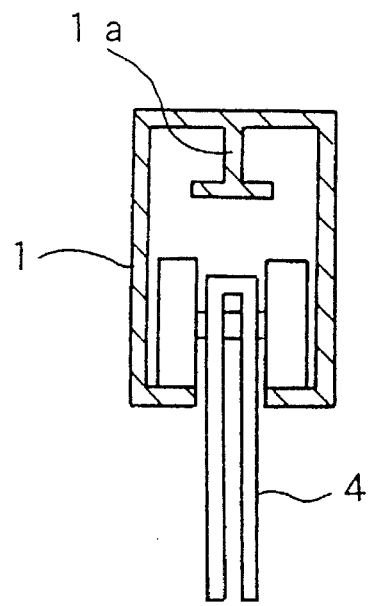
Figure 49:
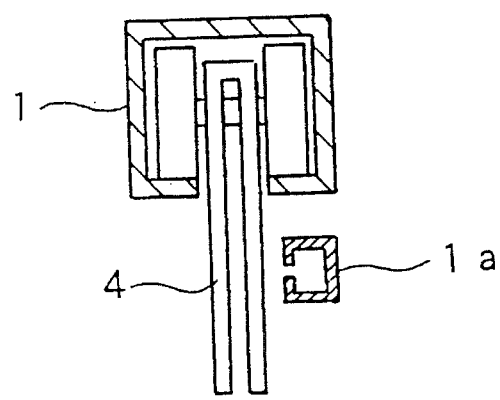
Figure 50:
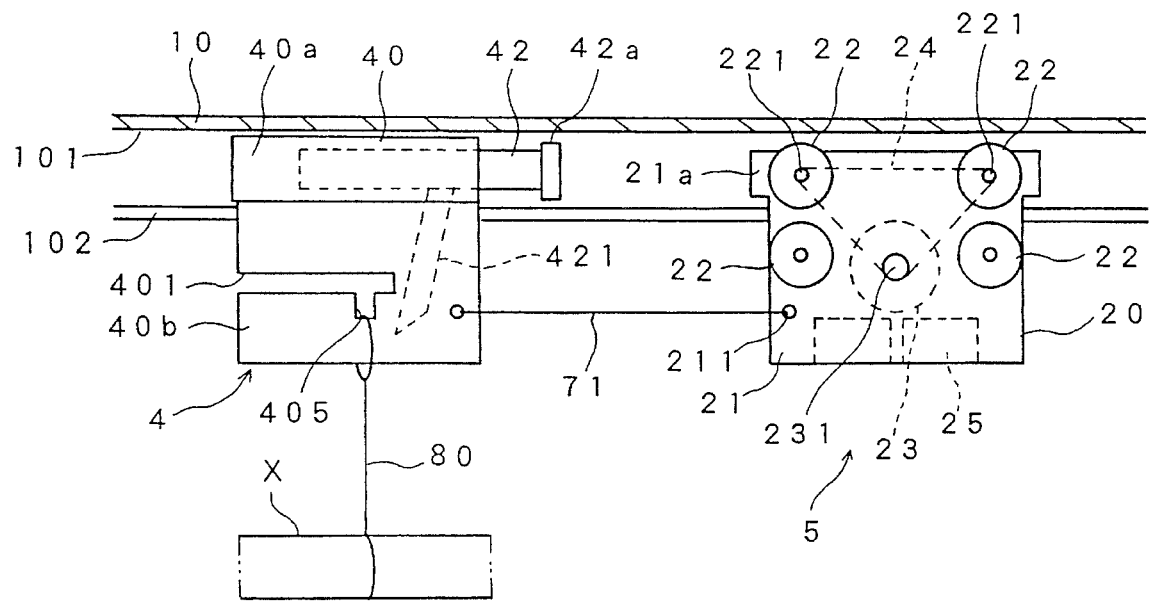
Figure 51:
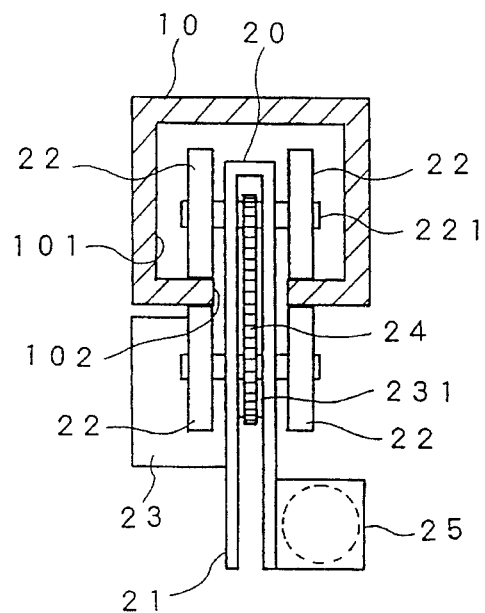
Figure 52:
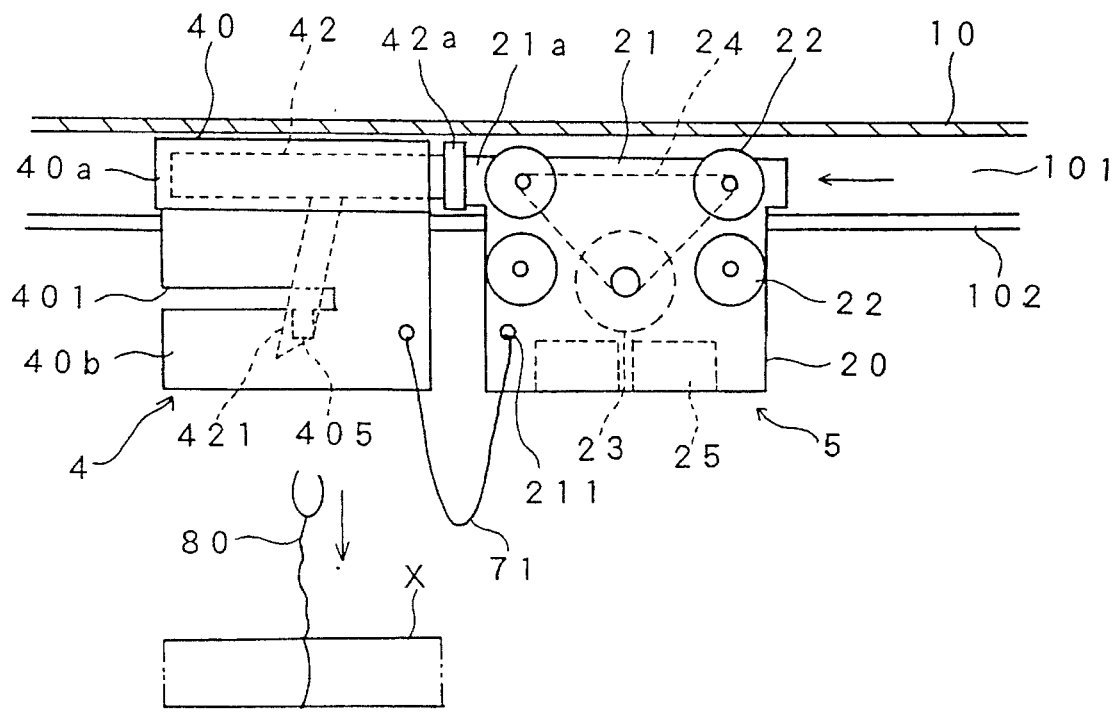
Figure 53:
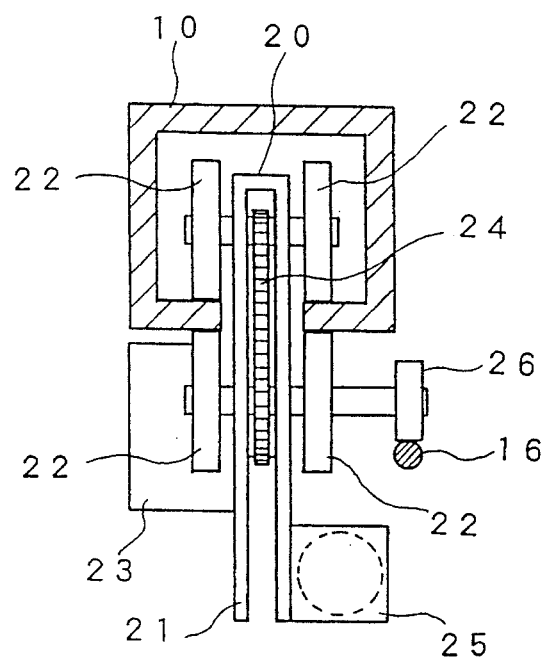
Figure 54:
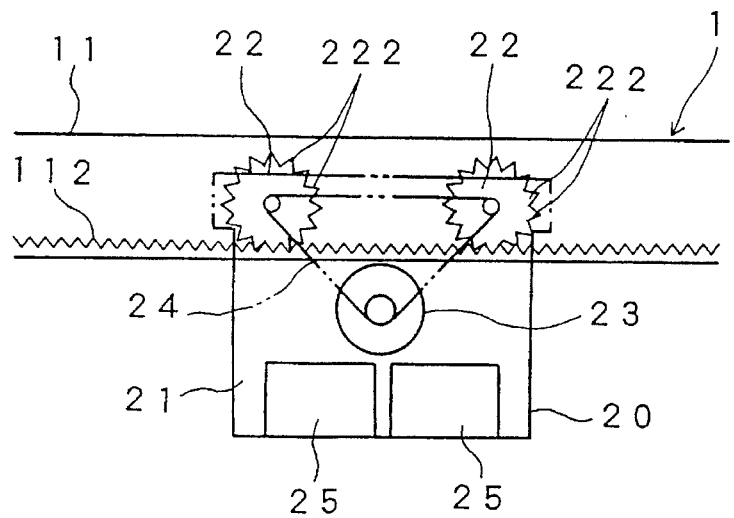
Figure 55:
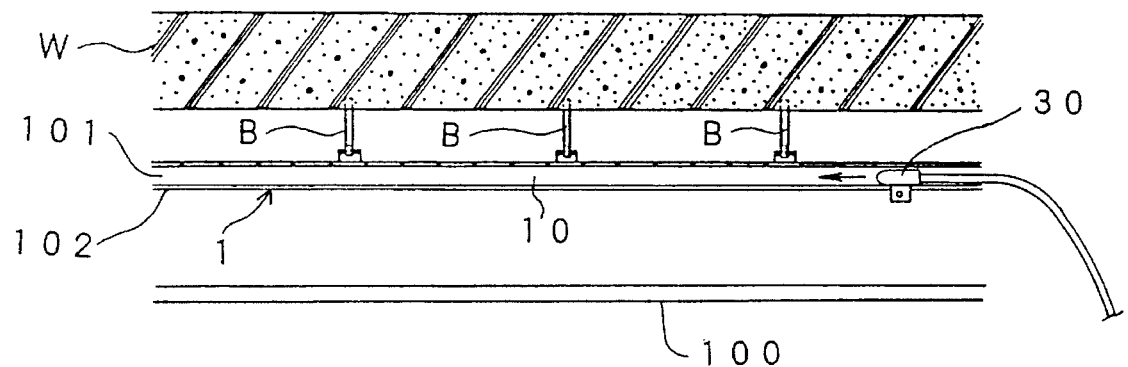
Figure 56:
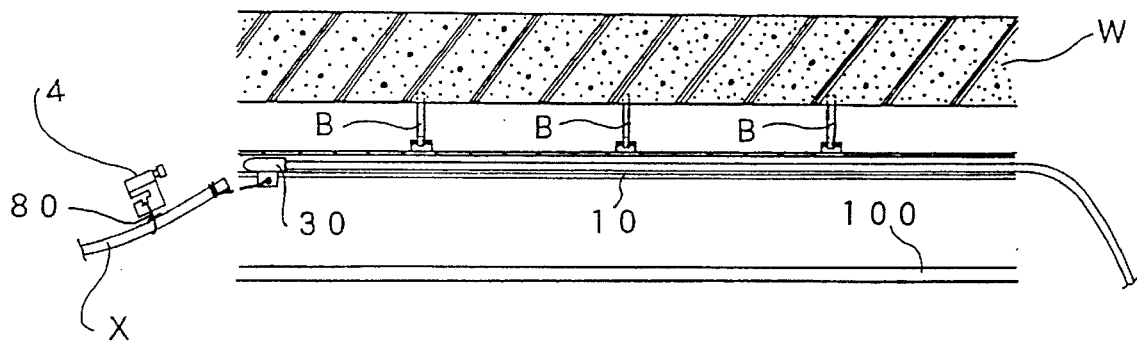
Figure 57:
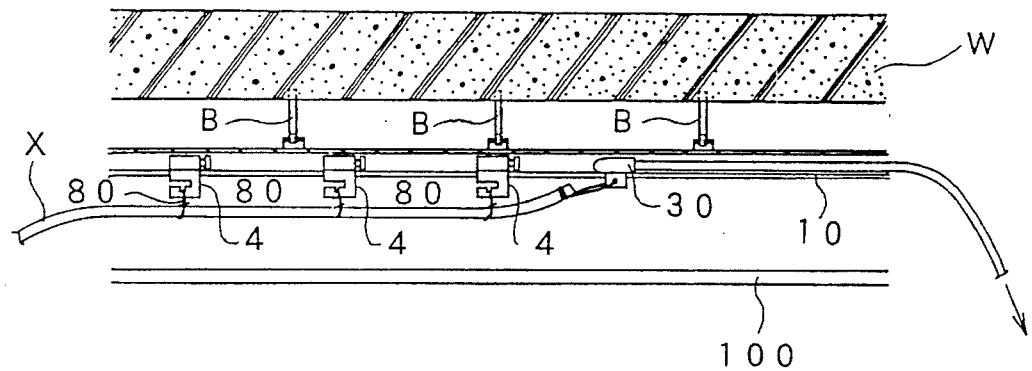
Figure 58:
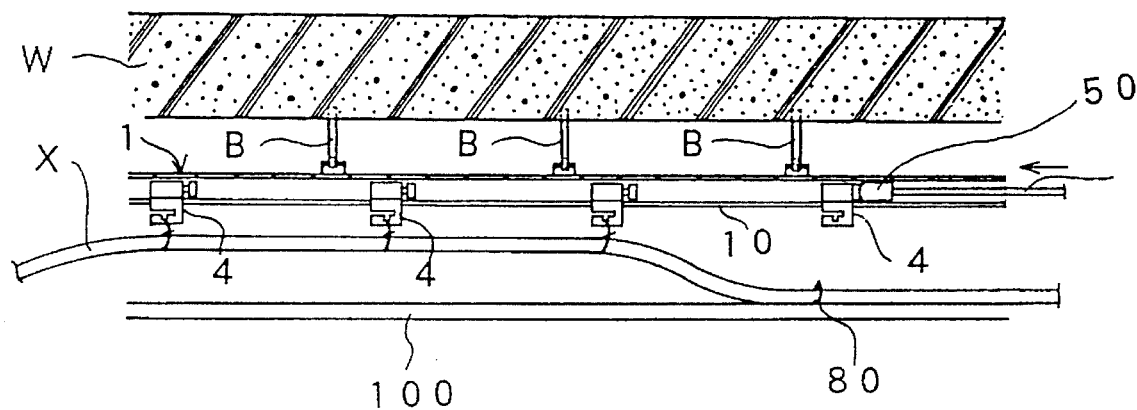
Figure 59:
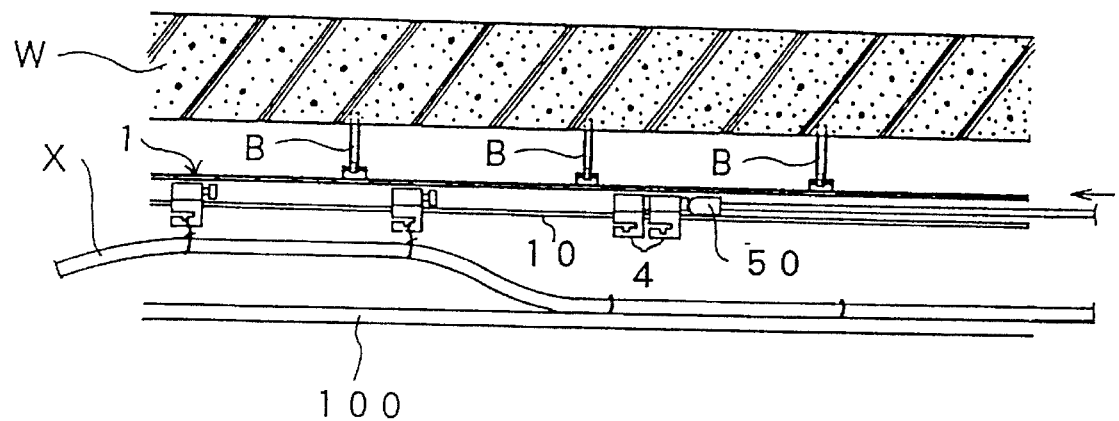
Figure 62:
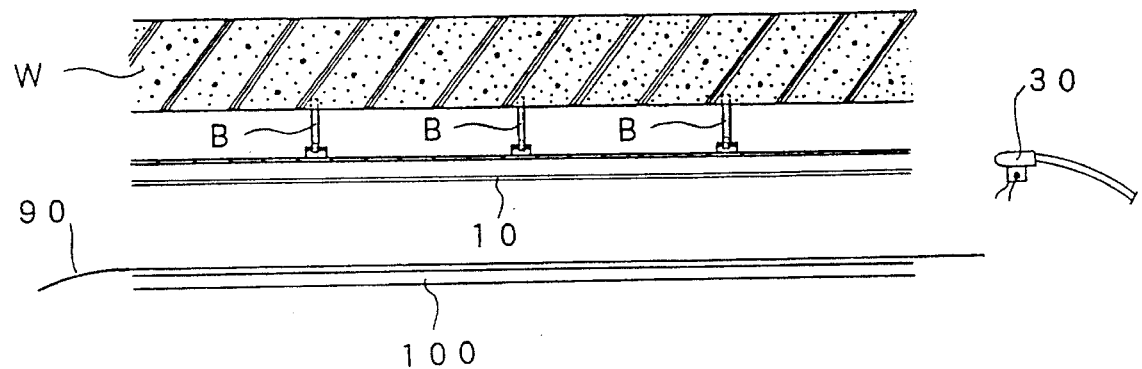
Figure 63:
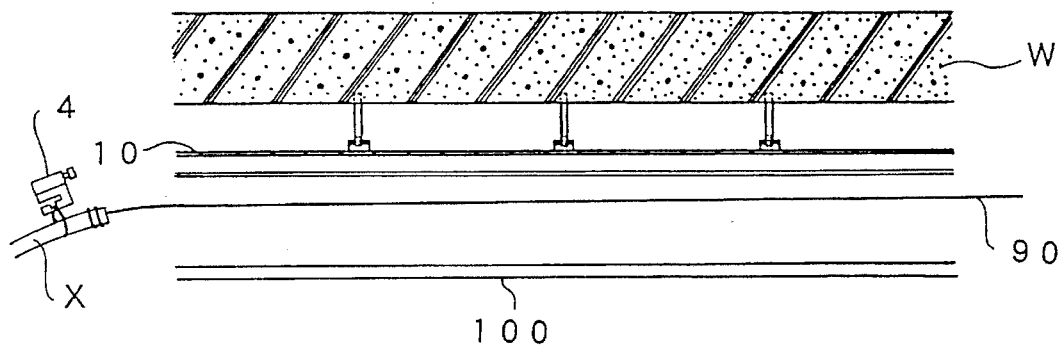
Figure 64:
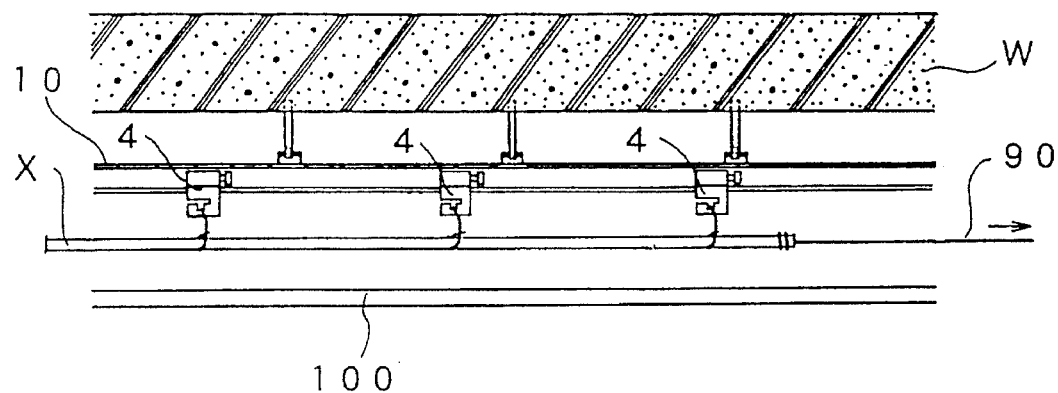
Figure 65:
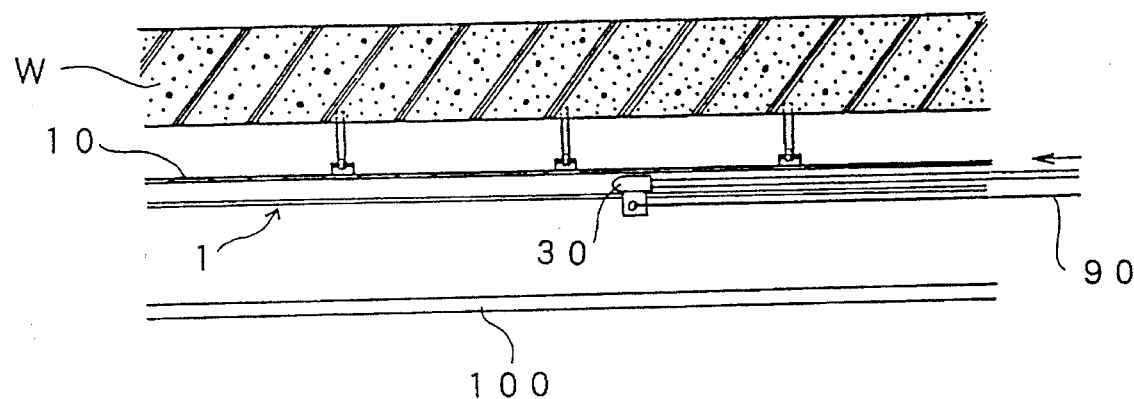
Figure 66:
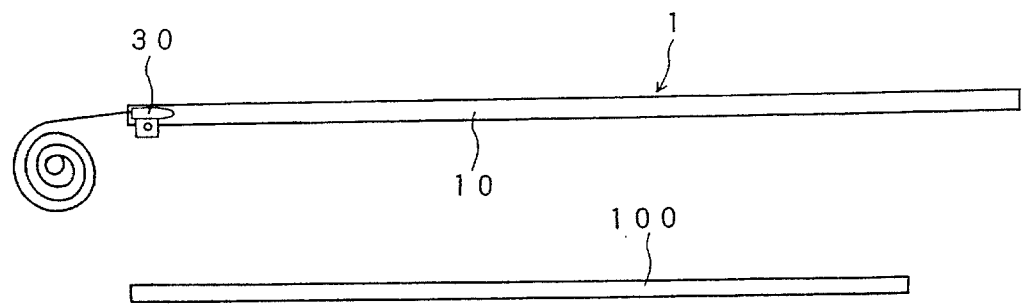
Figure 67:
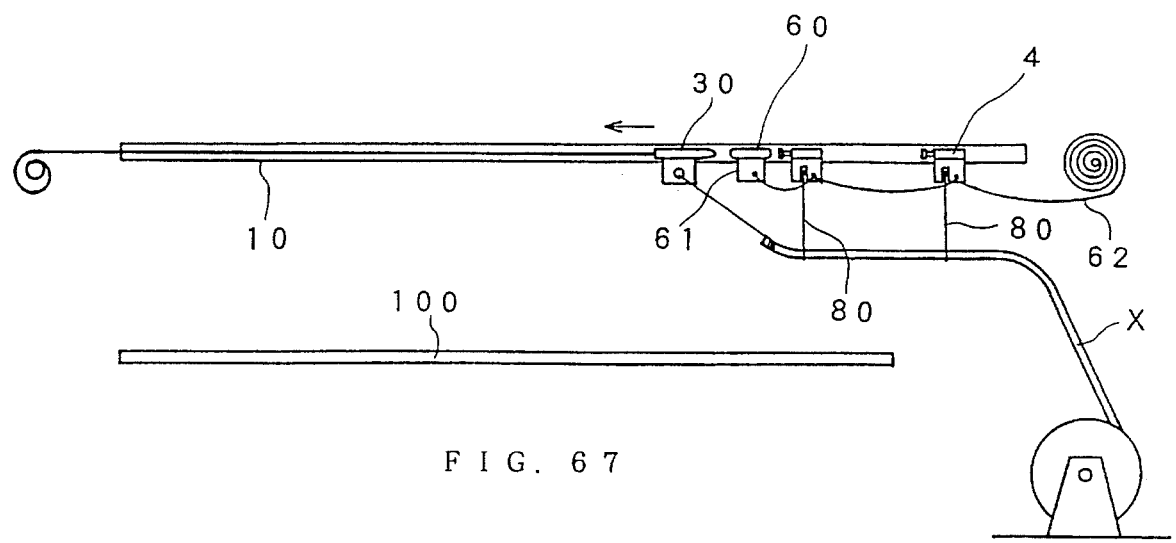
Figure 68:
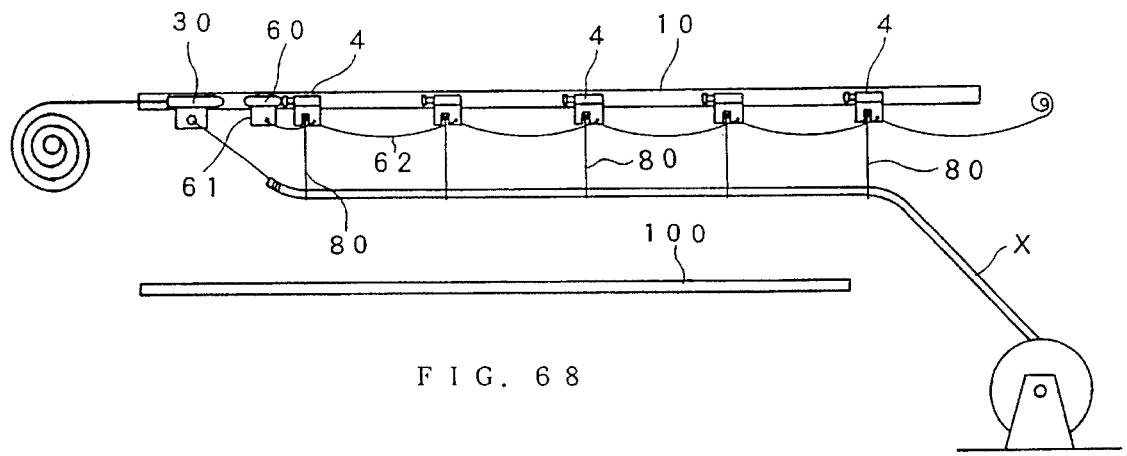
Figure 69:
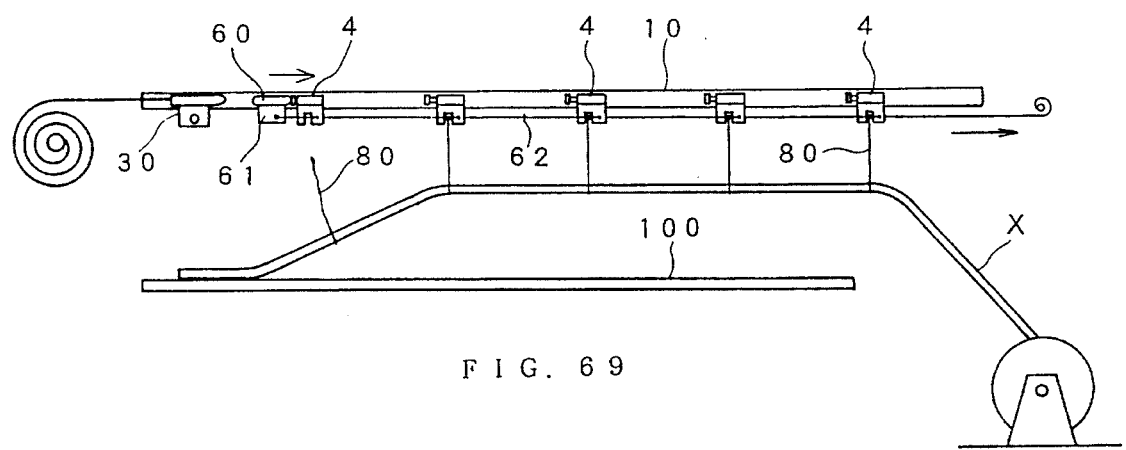
Figure 70:
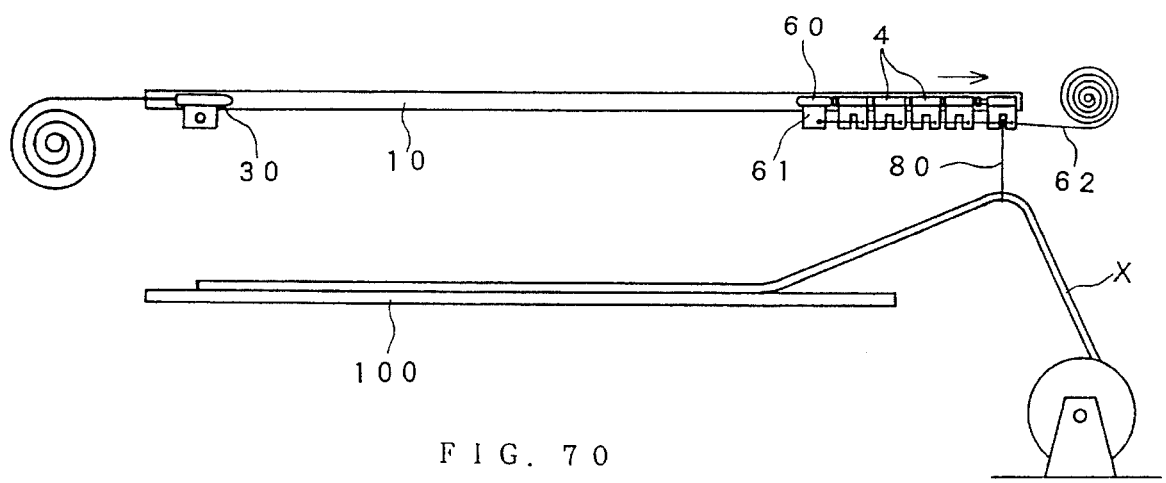
Figure 71:
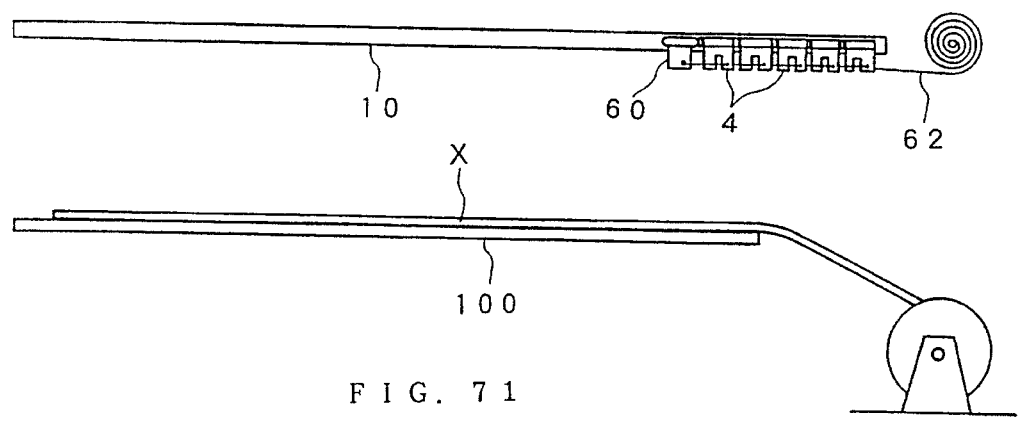
Figure 72:
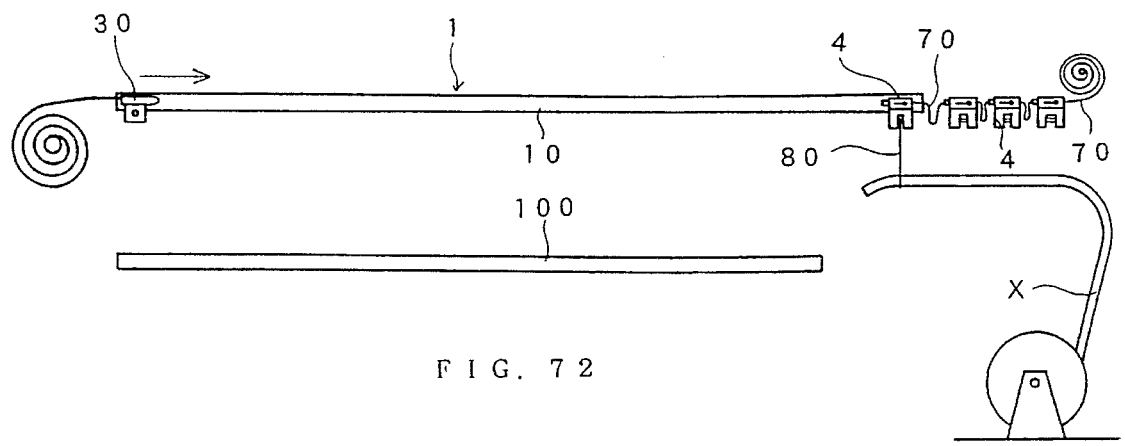
Figure 73:
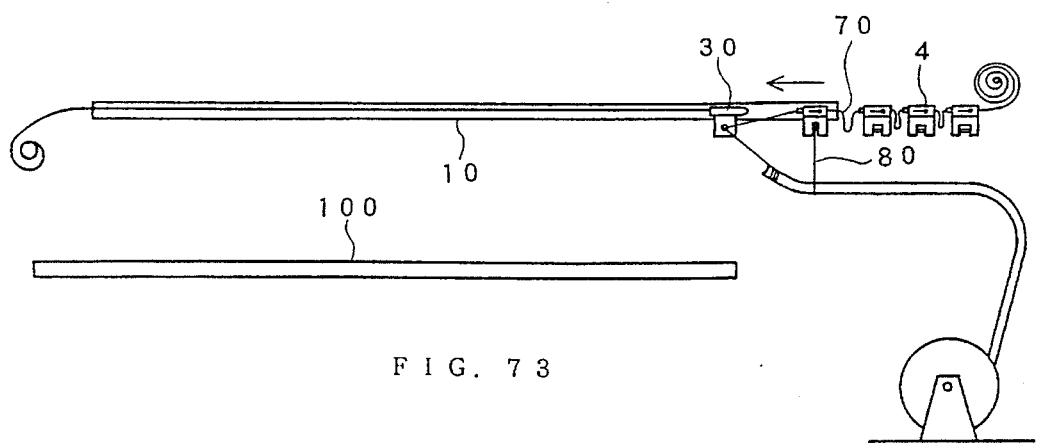
Figure 74:
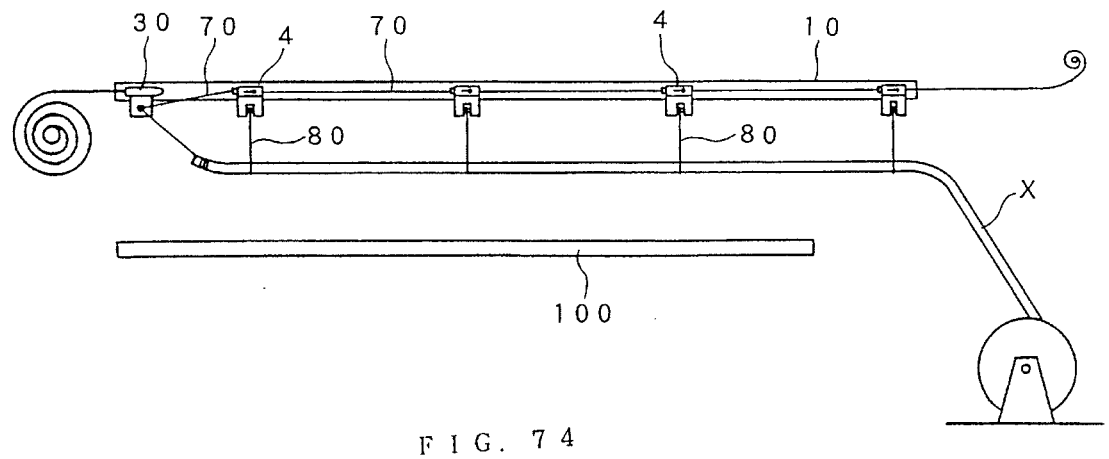
Figure 75:
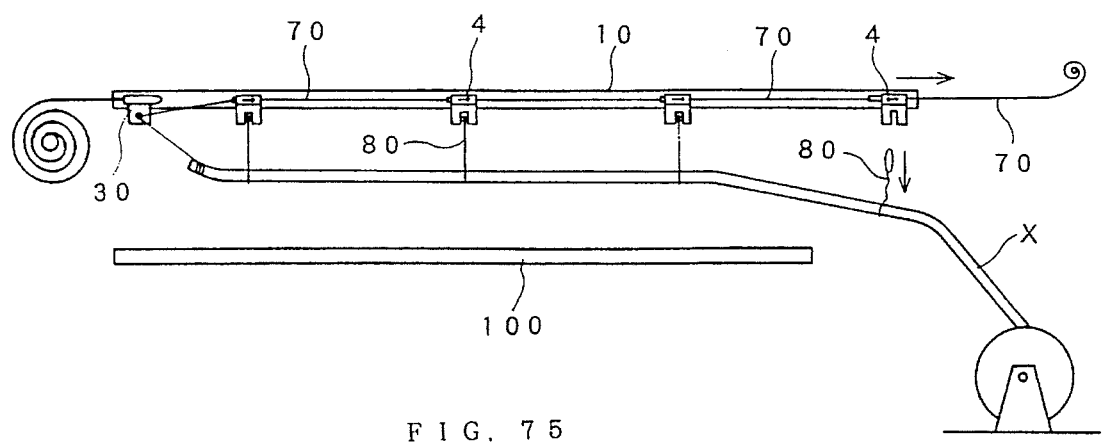
Figure 76:
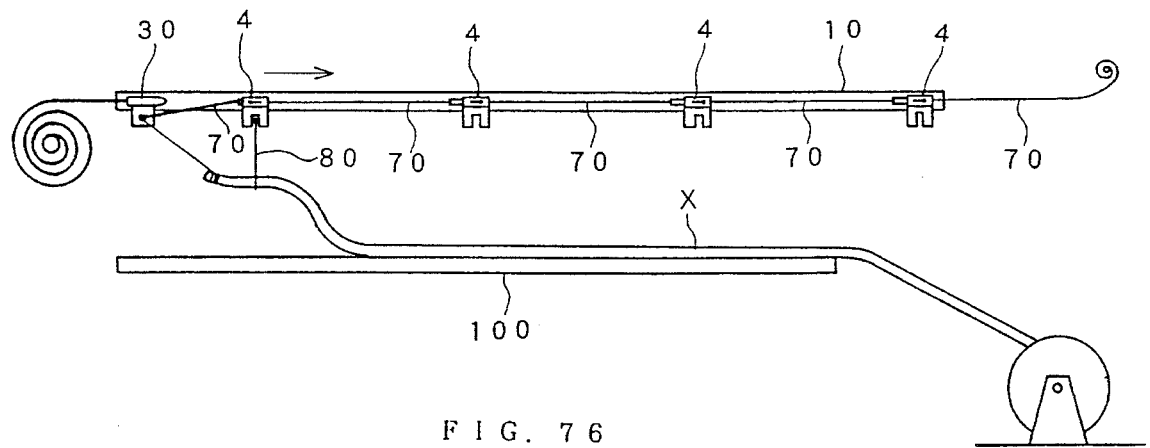
Figure 77:
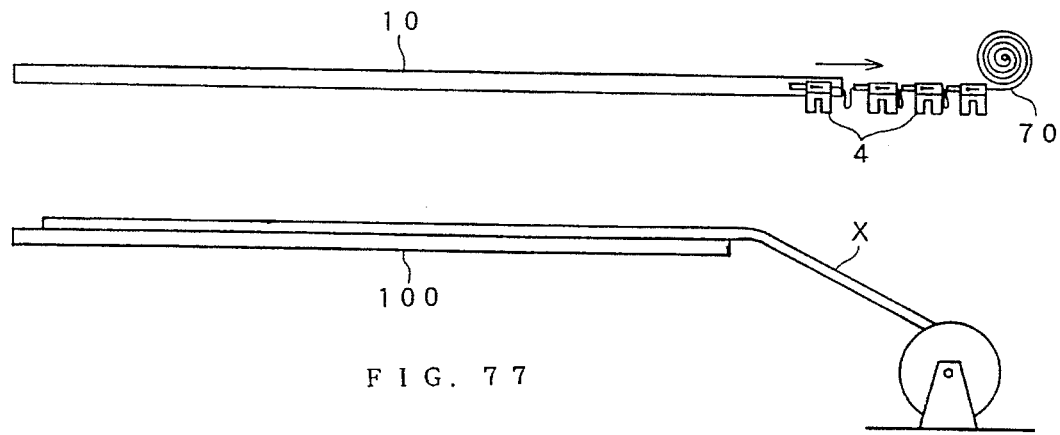
Figure 78:
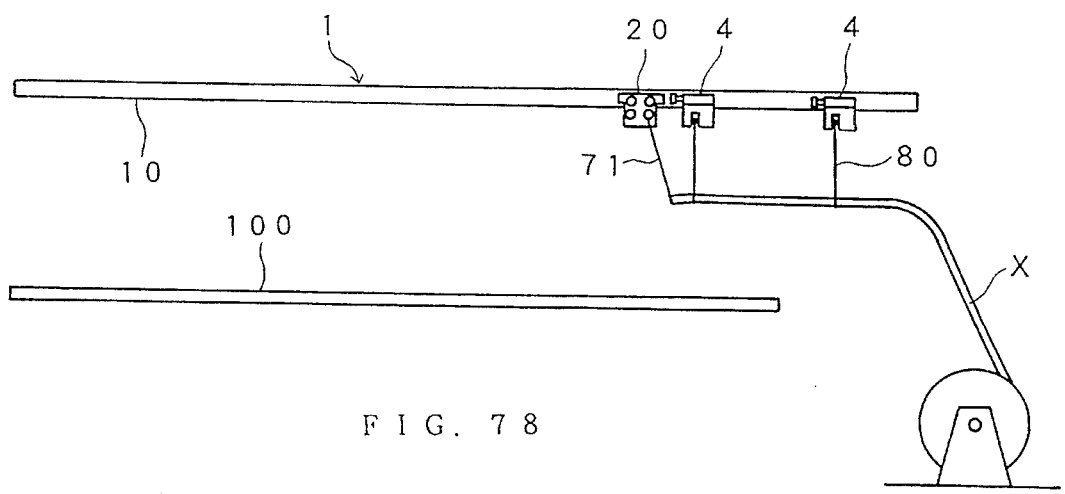
Figure 79:
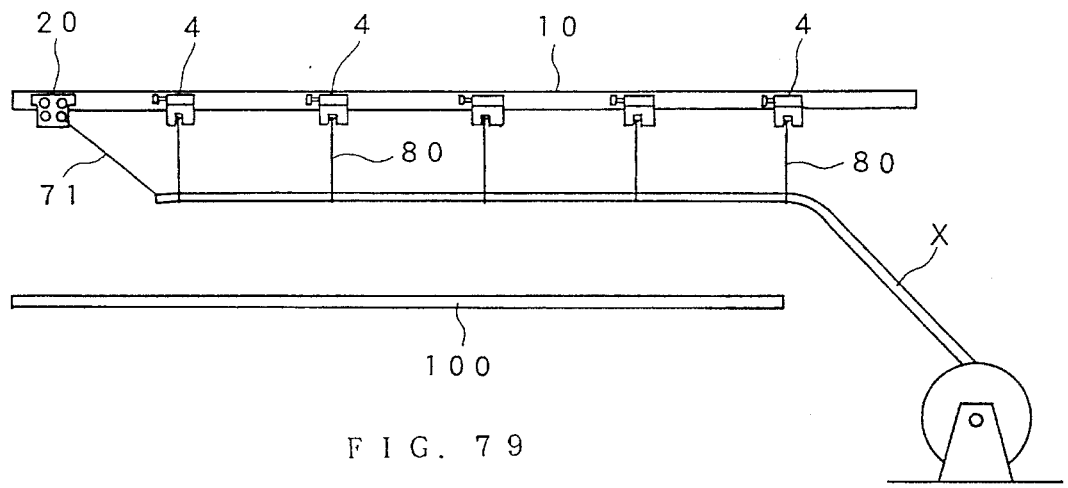
Figure 80:
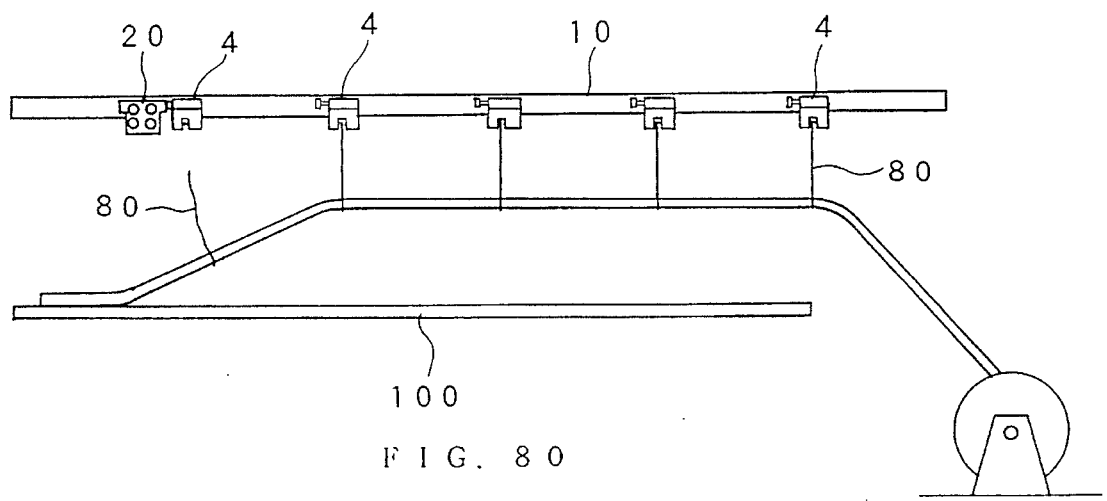
Figure 81:
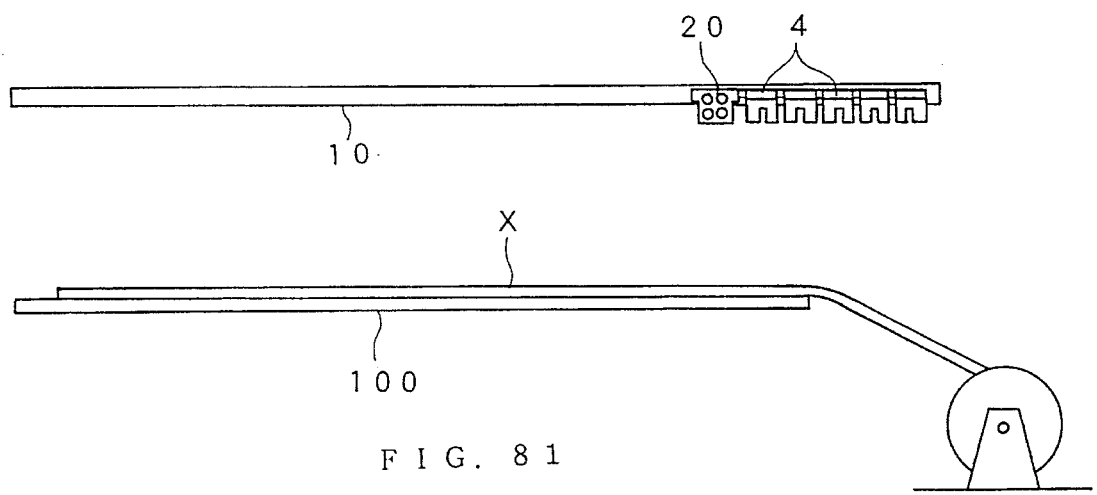
Figure 82:
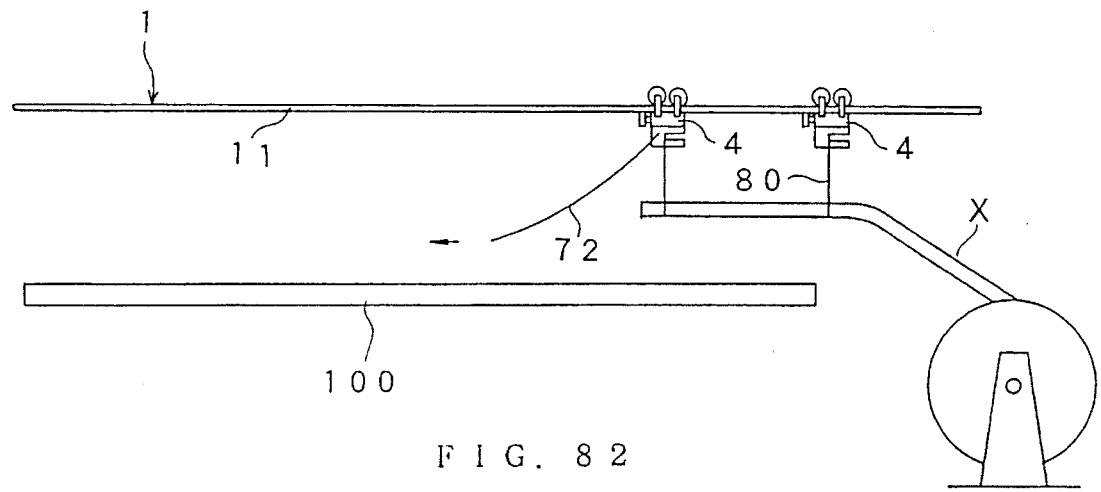
Figure 83:
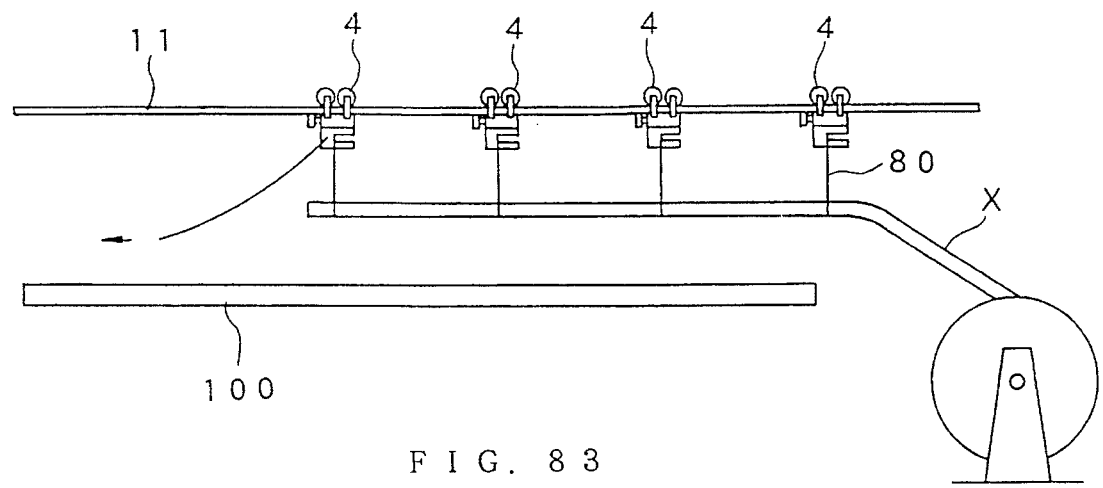
Figure 84:
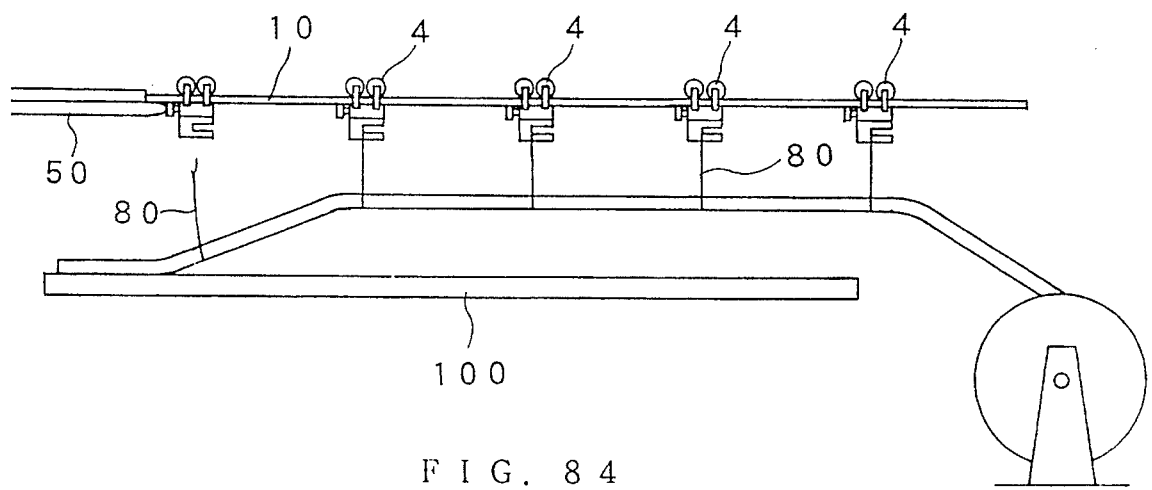
Figure 85:
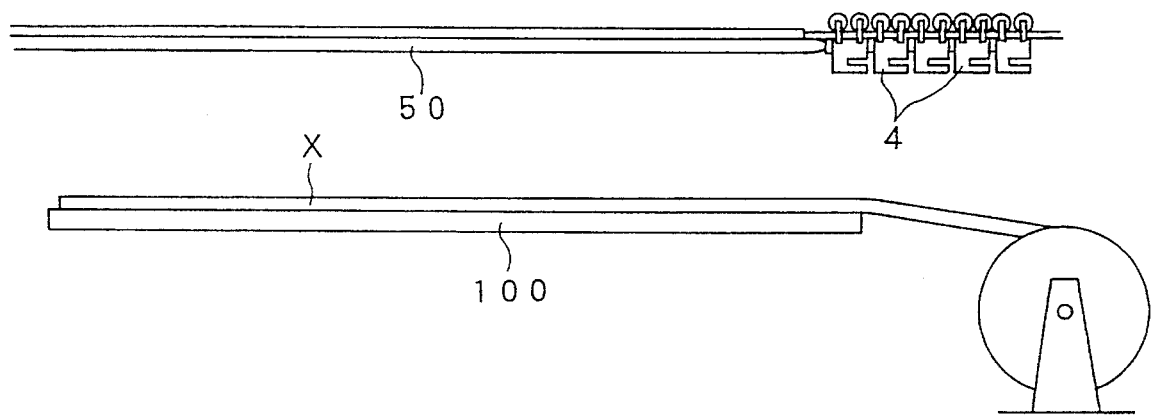
Figure 86:
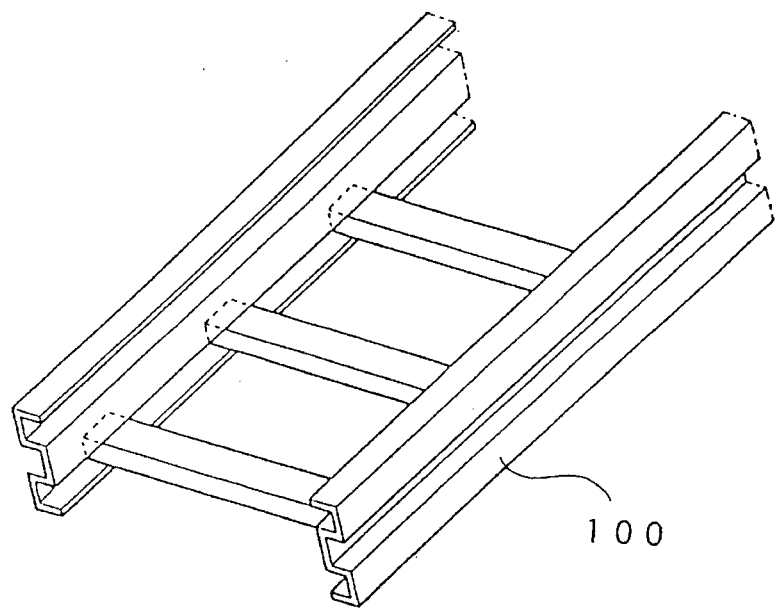
Figure 87:
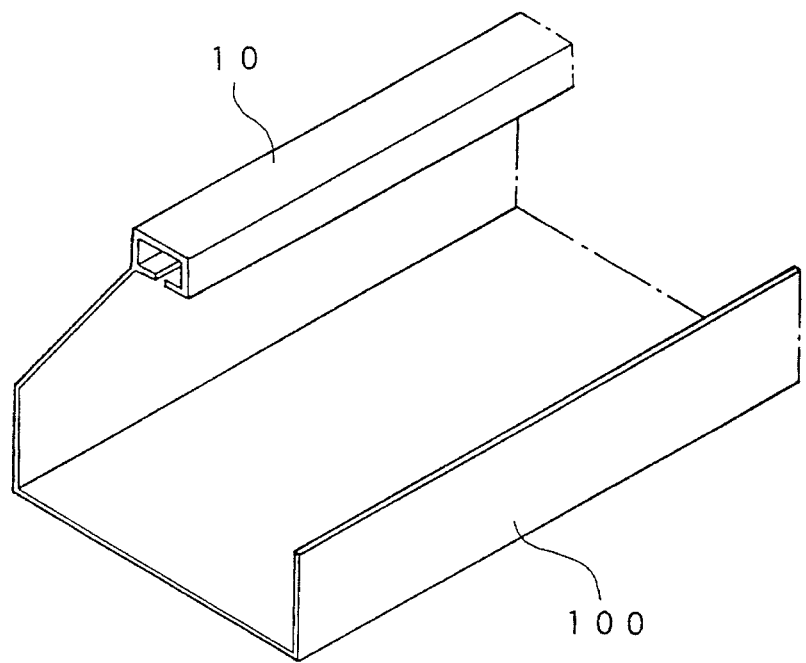
Figure 88:
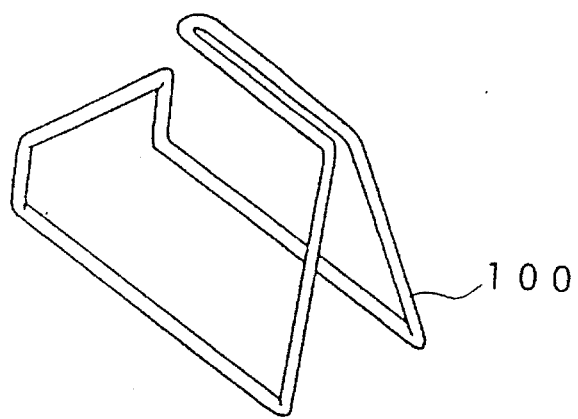
Figure 89:
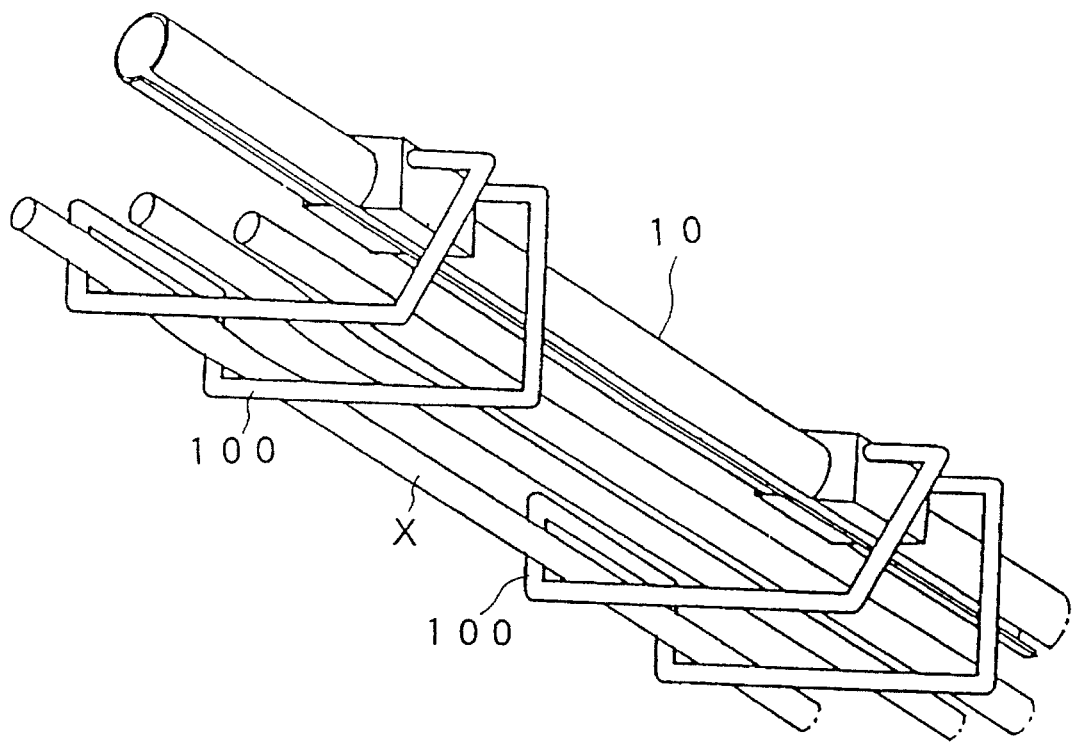
Figure 90:
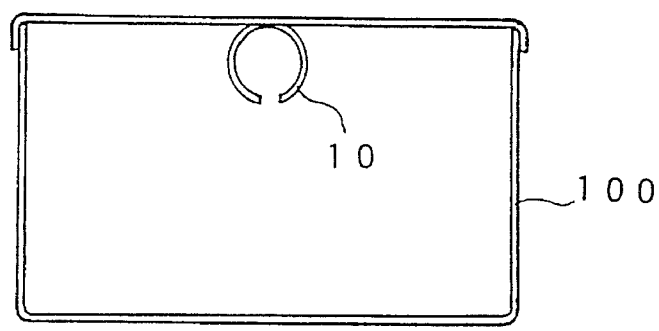
Figure 91:
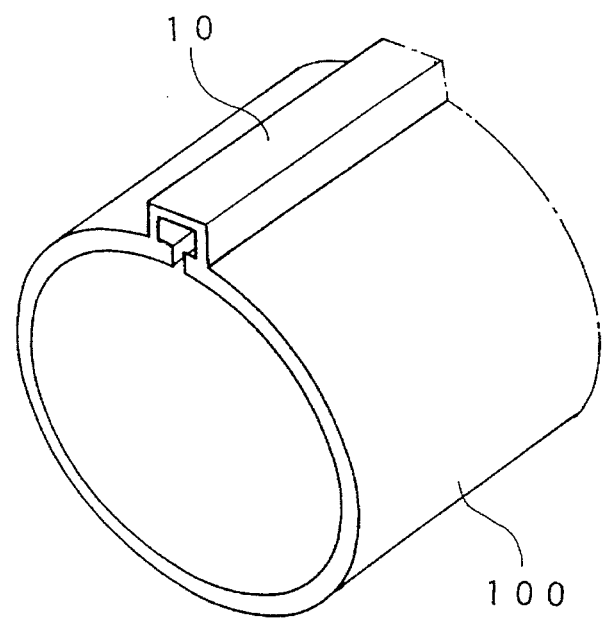
Figure 92:
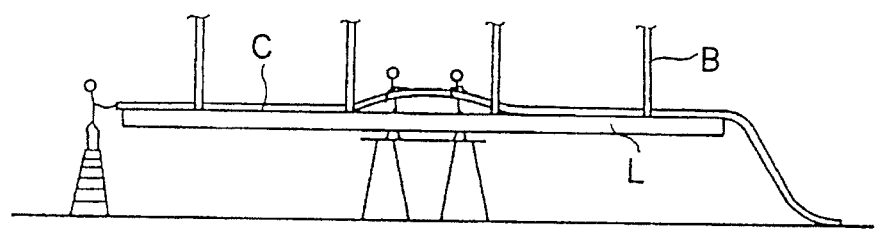
Figure 93:
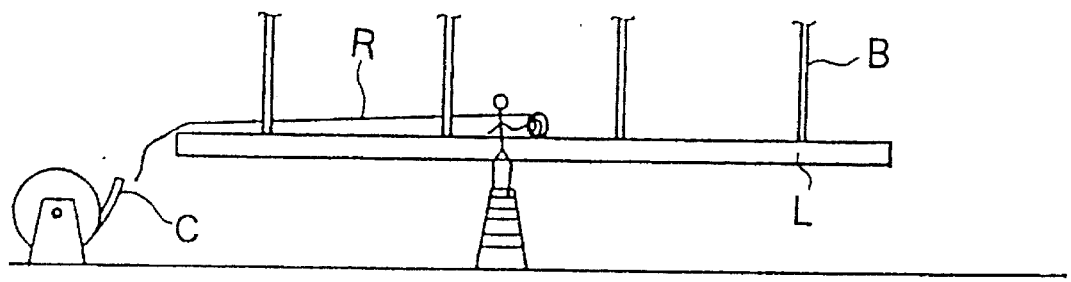
Figure 94:
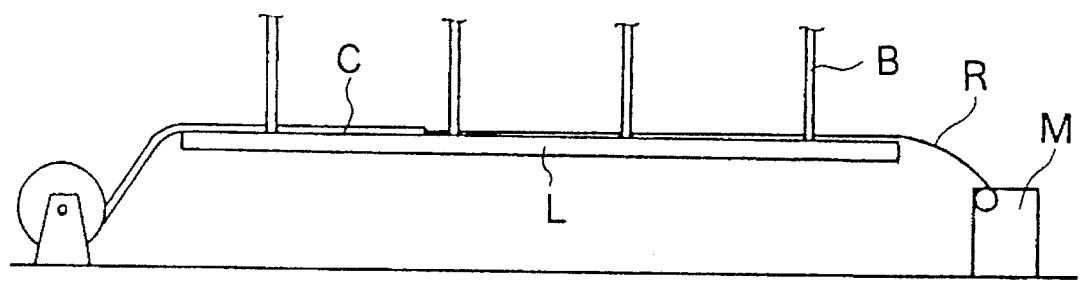

FIG, 14 is a front view of the suspension device of FIG. 13 held by a rail means;

FIG. 15 is a side view of another embodiment suspension device according to the present invention (Embodiment D-5);

FIG. 16 is a side view of the suspension device of FIG. 15 showing a state of the release function;

FIG. 17 a side view of another embodiment suspension device according to the present invention (Embodiment D-6);

FIG. 18 is a side view of the suspension device of FIG. 17 showing a state of the release function of the suspension device;

FIG. 19 a side view of another embodiment suspension device according to the present invention suspending a cable therefrom (Embodiment D-7);

FIG. 20 is a side view of the suspension device of FIG. 19 showing a state of the release function;

FIG. 21 is a perspective view of a rail means and a suspension device held thereby according to the present invention;

FIG. 22 is a perspective view of another rail means according to the present invention;

FIG. 23 is a front view of the rail means of FIG. 22 and the suspension device of FIG., 21 held thereby;

FIG. 24 is a perspective view of another rail means according to the present invention;

FIG. 25 is a front view of the rail means of FIG. 24 and a suspension device held thereby according to the present invention;

FIG. 26 is a perspective view of another rail means according to the present invention;

FIG. 27 is a front view of the rail means of FIG. 26 and the suspension device of FIG. 25 held thereby;

FIG. 28 is a side view of an embodiment apparatus showing a rail means, a suspension device, a suspension member and a trigger device according to the present invention (Embodiment A-1);

FIG. 29 is a perspective view of the trigger device of the apparatus of FIG. 28;

FIG. 30 is a side view of rail means, the suspension device, the suspension member and the dragging means of the apparatus of FIG. 28 showing a slate of connection between the suspended cable and the dragging means;

FIG. 31 is a perspective view of the dragging means of the apparatus of FIG. 28;

FIG. 32 is a partially cut side view of another embodiment apparatus showing a rail means, a suspension device suspending a cable with a suspension member and a trigger device (Embodiment A-2);

FIG. 33 is a partially cut side view of the apparatus of FIG. 32 showing a state of the release function of the apparatus;

FIG. 34 is a partially cut side view of another embodiment apparatus showing a rail means and suspension devices suspending a cable together with their suspension members (Embodiment A-3);

FIG. 35 is a partially cut side view of the apparatus of FIG. 34 showing a state of the release function of the apparatus;

FIG. 36 is a partially cut side view of another embodiment apparatus showing a rail means and a suspension device suspending cable with a suspension member (Embodiment A-4);

FIG. 37 is an exploded perspective view of the suspension device of the apparatus of FIG. 36;

FIG. 38 is a partially cut side view of another embodiment apparatus showing a rain means and a suspension device suspending a cable with a suspension member (Embodiment A-5);

FIG. 39 is an exploded perspective view of the suspension device of the apparatus of FIG. 38;

FIG. 40 is a perspective view of another dragging means according to the present invention;

FIG. 41 is a side view of another dragging means according to the present invention;

FIG. 42 is a perspective view of another trigger device according to the present invention;

FIG. 43 is a side view of another trigger device according to the present invention;

FIG. 44 side view of another dragging device according to the present invention;

FIG. 45 perspective view of a rail connection means according to the present invention;

FIG. 46 is a perspective view of another rail connection means according to the present invention;

FIG. 47 is a cross-sectional view of an embodiment of a rail means and a conduction means, which are separately prepared;

FIG. 48 is a cross-sectional view of another embodiment of a rail means and a conduction means, which are separately prepared;

FIG. 49 is a cross-sectional view of another embodiment of a rail means and a conduction means, which are separately prepared;

FIG. 50 is a side view of another embodiment apparatus according to the present invention showing a rail means, a suspension device suspending a cable with a suspension member and an automatic device (Embodiment A-6);

FIG. 51 a front view of the rail means and the automatic device of FIG. 50 held by the rail means;

FIG. 52 a side view of the apparatus of FIG. 50 showing a state of the release function of the apparatus;

FIG. 53 is a front view of another embodiment automatic device held by another embodiment rail means according to the present invention;

FIG. 54 is a side view of another embodiment automatic device and another rail means according to the present invention;

FIG. 55 is a side view showing a step of an embodiment cable laying method using the apparatus of Embodiment A-1;

FIG. 56 is a side view showing another step of said embodiment method using the apparatus of Embodiment A-1;

FIG. 57 is a side view showing another step of said embodiment method using the apparatus of Embodiment A-1;

FIG. 58 is a side view showing another step of said embodiment method using the apparatus of Embodiment A-1;

FIG. 59 is a side view showing another step of said embodiment method using the apparatus of Embodiment A-1;

FIG. 60 is a side view showing another step of said embodiment method using the apparatus of Embodiment A-1;

FIG. 61 is a side view showing another step of said embodiment method using the apparatus of Embodiment A-1;

FIG. 62 is a side view showing another step of said embodiment method using the apparatus of Embodiment A-1;

FIG. 63 is a side view showing another step of said embodiment method using the apparatus of Embodiment A-1;

FIG. 64 is a side view showing another step of said embodiment method using the apparatus of Embodiment A-1;

FIG. 65 is a side view showing a step of another embodiment method using the apparatus of Embodiment A-1;

FIG. 66 is a side view showing a step of an embodiment cable laying method using the apparatus of Embodiment A-2;

FIG. 67 is a side view showing another step of said embodiment method using the apparatus of Embodiment A-2;

FIG. 68 is a side view showing another step of said embodiment method using the apparatus of Embodiment A-2;

FIG. 69 is a side view showing another step of said embodiment method using the apparatus of Embodiment A-2;

FIG. 70 is a side view showing another step of said embodiment method using the apparatus of Embodiment A-2;

FIG. 71 is a side view showing a step of another embodiment method using the apparatus of Embodiment A-2;

FIG. 72 is a side view showing a step of an embodiment cable laying method using the apparatus of Embodiment A-4;

FIG. 73 is a side view showing another step of said embodiment method using the apparatus of Embodiment A-4;

FIG. 74 is a side view showing another step of said embodiment method using the apparatus of Embodiment A-4;

FIG. 75 is a side view showing another step of said embodiment method using the apparatus of Embodiment A-4;

FIG. 76 is a side view showing another step of said embodiment method using the apparatus of Embodiment A-4;

FIG. 77 is a side view showing a step of another embodiment method using the apparatus of Embodiment A-4;

FIG. 78 is a side view showing a step of an embodiment cable laying method using the apparatus of Embodiment A-6;

FIG. 79 is a side view showing another step of said embodiment method using the apparatus of Embodiment A-6;

FIG. 80 is a side view showing another step of said embodiment method using the apparatus of Embodiment A-6;

FIG. 81 is a side view showing a step of another embodiment method using the apparatus of Embodiment A-6;

FIG. 82 is a side view showing a step of an embodiment cable laying method using an apparatus including the suspension devices of FIG. 21;

FIG. 83 is a side showing a step of another embodiment method using the apparatus including the suspension devices of FIG. 21;

FIG. 84 is a side showing a step of another embodiment method using the apparatus including the suspension devices of FIG. 21;

FIG. 85 is a side showing a step of another embodiment method using the apparatus including the suspension devices of FIG. 21;

FIG. 86 is a perspective view showing another cable receiver;

FIG. 87 is a perspective view showing another cable receiver;

FIG. 88 a perspective view showing another cable receiver;

FIG. 89 a perspective view showing a state of use of the receiver of FIG. 88;

FIG. 90 is a front view showing another cable receiver;

FIG. 91 is a perspective view showing another cable receiver;

FIG. 92 is a side view showing a step of a conventional cable laying method;

FIG. 93 is a side view showing a step of another conventional cable laying method;

FIG. 94 is a side view showing a step of another conventional cable laying method;

DETAILED DESCRIPTION OF THE PREFERRED EMBODIMENT

Figure 1:
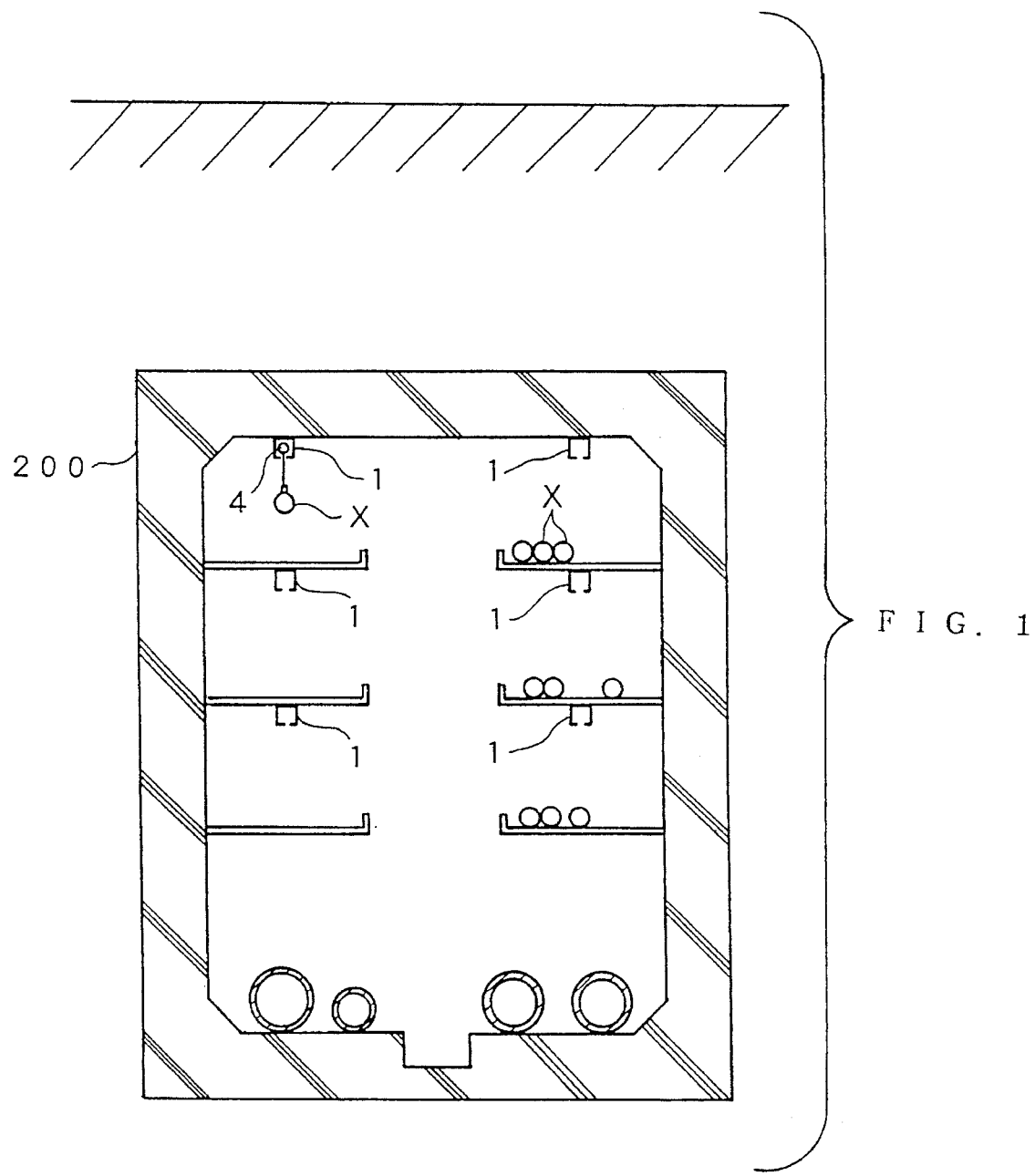
FIG. 1 is a cross-sectional view showing an example setting of receiving means and rail means in a closed conduit according to the present invention.

Cables, electric wires and flexible pipes such as water pipes and gas pipes (X) are usually laid in places such as a closed conduit 200 as shown in FIG. 1 and on places such as a cable receiver (cable ladder) 100 as shown in FIG. 2. It is often extremely hard to lay a cable in or on such a place when the laying route is very long and/or winding and/or especially when there exit other cables previously laid in the route.

The present invention aims at smoothing linear material laying operations, which is hereafter described in detail using several embodiments which should be understood with reference to the accompanying drawings.

A suspension device 4 according to the present invention chiefly comprises a suspension means, a release means and an activation means, whereas said suspension means suspends a cable (X), said release means releases the cable (X) and said activation means activates the release function of the suspension device 4. Said suspension means can be anything as long as it is capable of suspendedly holding a cable (X), directly with the suspension device 4 or by means of a suspension member. Said release means releases the suspended cable (X) when activated by said activation means, mechanically or electrically. Said activation means activates the release function of said release means so that the cable (X) carried through the cable route may be dropped onto the cable receiver which is installed underneath the rail means along the route on which said suspension device 4 travels carrying the cable (X).

EMBODIMENT D-1:

In FIG. 3 through FIG. 6, a suspension device 4 according to the present invention is shown, comprising a body member 40 configured like a hard book cover as shown in the figures, two pairs of wheel members 46 attached turnably on both sides of the body member 40 by wheel axles 461, a hanger member a hanging portion 431, a suspension string 80 to be tied at one end thereof to tire hanging portion 431 and to a cable at the other end thereof, and a turn member 44 which provides the activation means.

Figure 3:
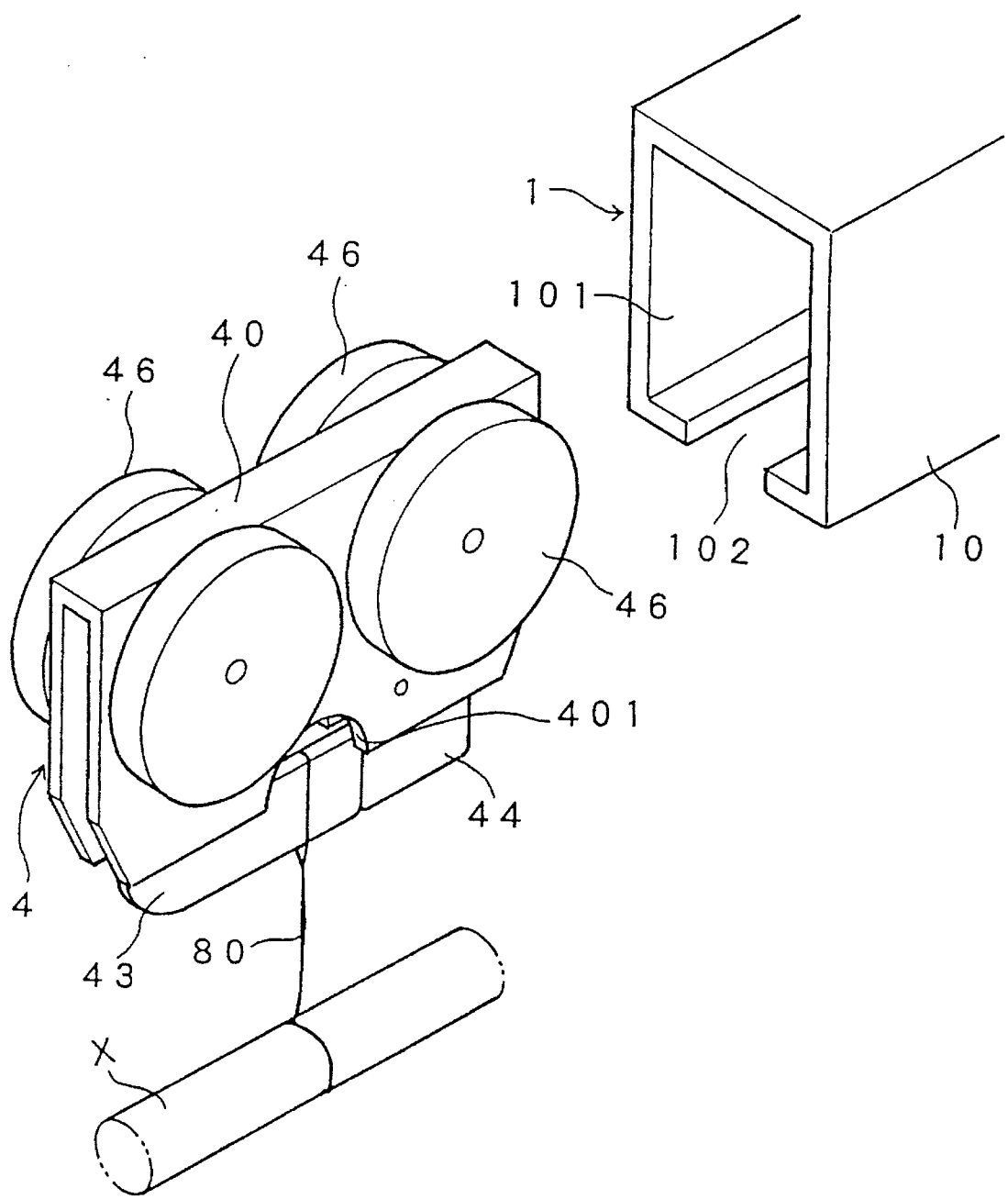
FIG. 3 is a perspective view showing an embodiment suspension device according to the present invention (Embodiment D-1)
Figure 4:
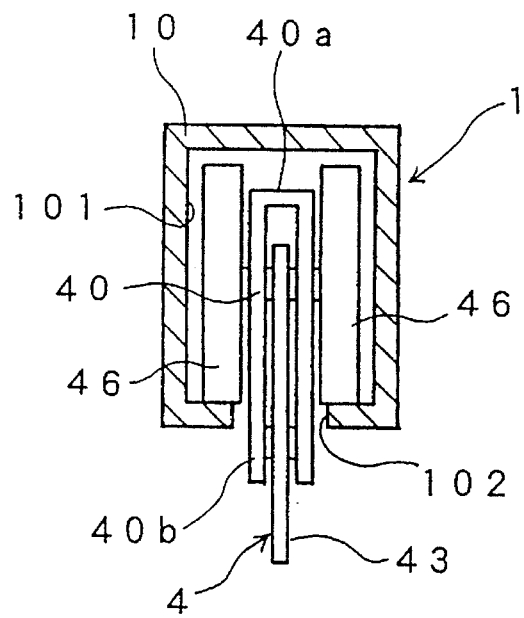
FIG. 4 a front view of the suspension device of FIG. 3 held by a rail means according to the present invention.

The internal space provided in said bookcover-like body member 40 permits said hanger member 43 and said turn member 44 to move therein. The rail means 1 comprises a chute 10 having a passage 101. The upper portion 40a of said body member 40 is provided with two pairs of wheel members 46 which roll through said passage 101 of said chute 10. Said chute 10 is also provided with a longitudinal open slit 102 running throughout the passage 101 of said chute 10 at the bottom of said passage 101. The slit 102 is made only slightly wider than the body member 40. The lower portion 40b of said body member 40 sticks out of the slit 102 with the upper portion 40a of the body member 40 remaining within the passage 101. A cut-off portion 401 is provided at the bottom of each side plate portion of the lower portion 40b as shown in FIG. 3 such that said suspension string 80 can go therethrough to be tied to said hanging portion 431 of the hanger member 43.

Figure 5:
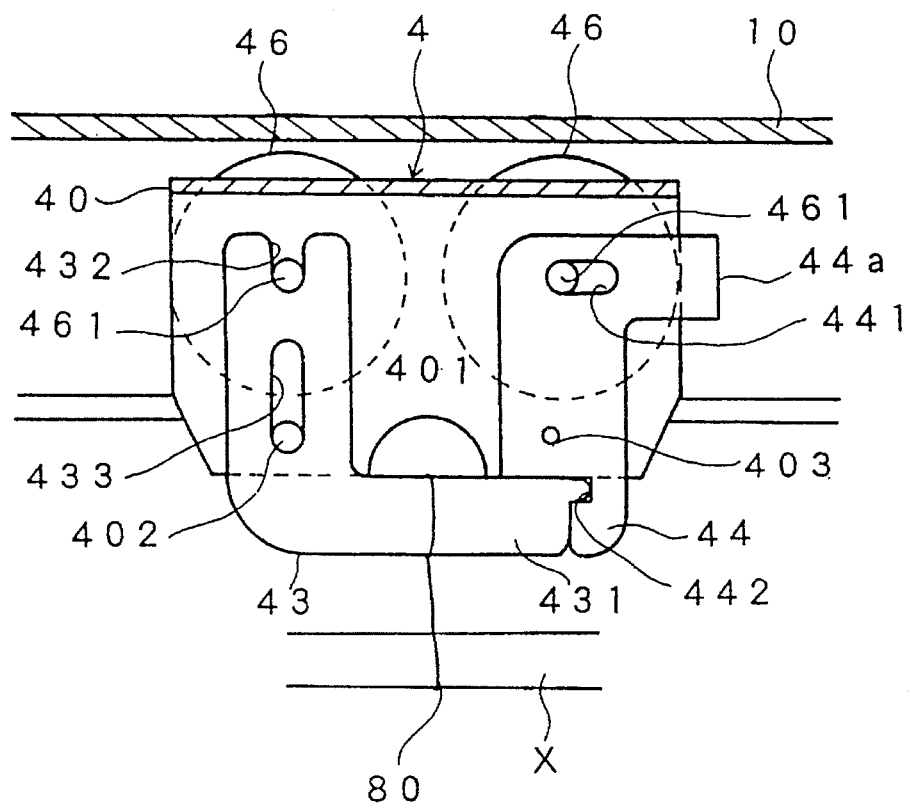
FIG. 5 partially cut side elevational view of the suspension device of FIG. 3 showing a cable suspended from the suspension device.
Figure 6:
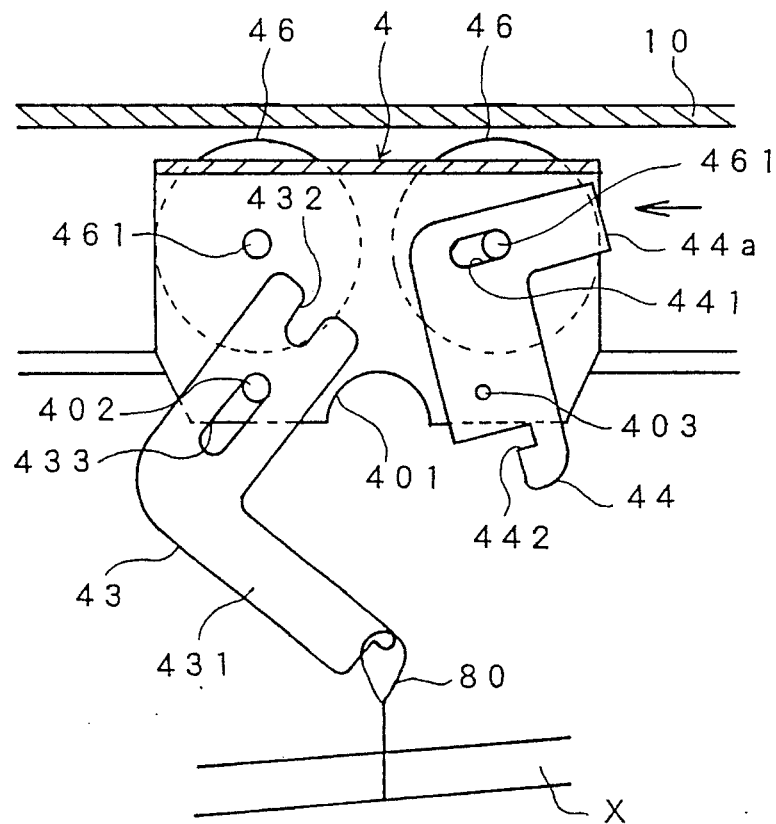
FIG. 6 is a partially cut side elevational view of the suspension device of FIG. 3 showing a functioning state of the suspension device.

The hanger member 43 is formed in a shape "L" having a cut-off edge 432 at the uppermost part thereof. The lower part of said hanger member 43 provides the hanging portion 431. The movement of the hanger member 43 is restricted by the wheel axle 461 in said cut-off edge 432. As shown in FIG. 5, the upper corner protruding edge of said hanging portion 431 is hooked at the cavity 442 of the turn member 44 which is located correspondingly to said upper corner protruding edge and the said edge is held in the cavity 442. The hanger member 43 is provided with a vertically extending aperture 433 in the upper middle portion thereof. The pin 402 provided across said space in the body member 40 goes through said aperture 433 and turningly holds the hanger member 43 preventing the hanger member 43 from falling off when the release means is activated as shown in FIG. 6.

A horizontally extending aperture 441 is provided in the upper part of said turn member 44. The wheel axle 461 in the aperture 441 restricts the movement of the turn member 44. The face edge 44a substantially protrudes from the upper portion 40a of the body member 40. The turn member 44 turns around the turn pin 403 provided in the lower middle part thereof until the wheel axle 461 in the aperture 441 stops its movement after the face edge 44a is pressed and the cavity 442 releases the hanging portion 431 of the hanger member 43. As shown in FIG. 6, the hanger member 43 then moves downward until the pin 402 comes to the upper end of the aperture 433 as the hanger member 43 turns around the pin 402, releasing the suspension string 80 slippingly and the cable (X) tied to the string 80 as well. The cable (X) then falls onto the cable receiver installed below.

Figure 7:
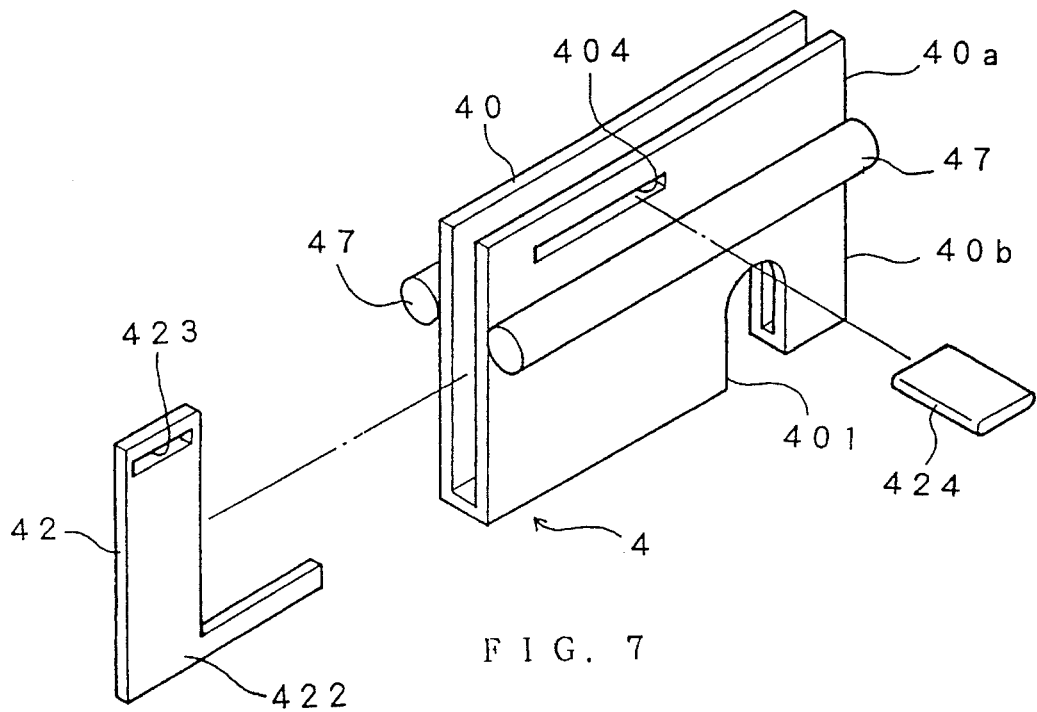
FIG. 7 is an exploded view of another embodiment suspension device according to the present invention (Embodiment D-2)
Figure 8:
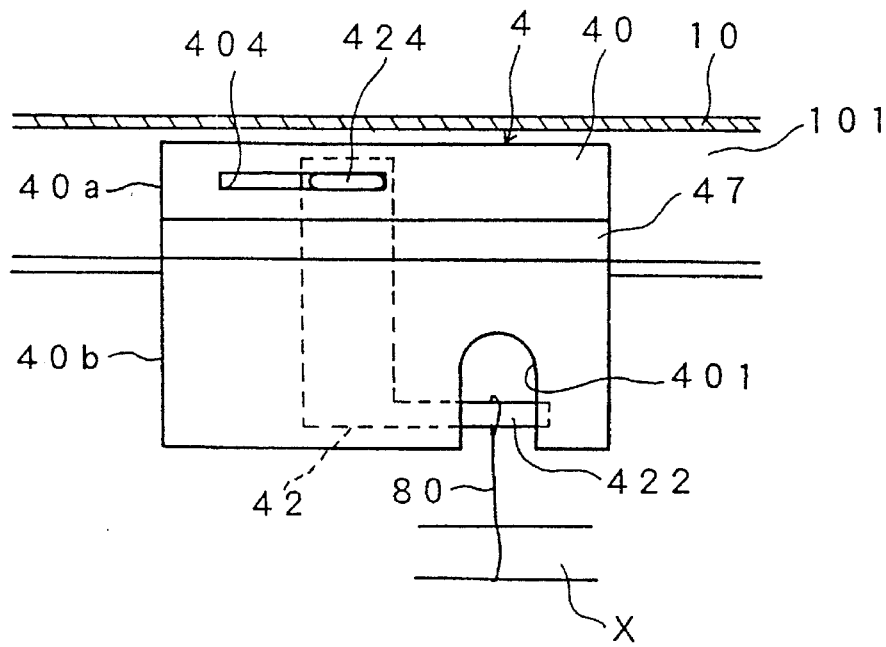
FIG. 8 is a side view of the suspension device of FIG. 7 showing a cable suspended from the suspension device.
Figure 9:
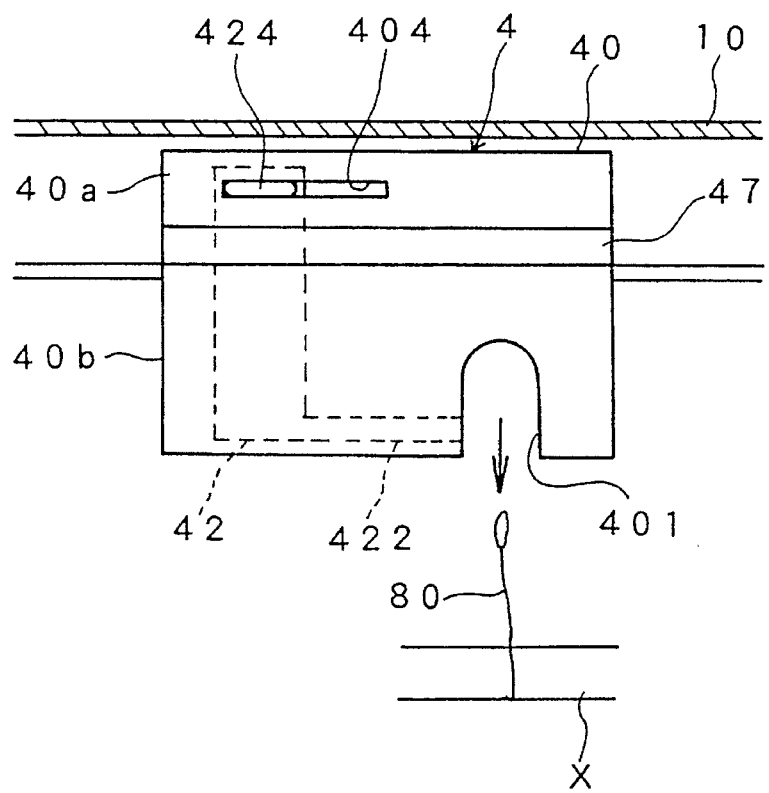
FIG. 9 is an exploded view of the suspension device of FIG. 7 showing a state of the cable releasing function.

EMBODIMENT D-2:

FIGS. 7 to 9 show another suspension device 4 according to the present invention, which travels through the passage 101 of the chute 10, comprising a body member 40 and a sliding member 42 having a hanger portion 422. Said body member 40 formed like a hard book cover is comprised of the upper portion 40a and the lower portion 40b (just for a descriptive purpose). The tipper portion 40a is provided with twin windows 404 prepared in parallel in the side plate portions thereof and a pair of sliding bars 47 horizontally placed on the outer side plate portions thereof as shown in FIG. 7. The sliding bars 47 are to support the suspension device 4 in the passage 101 and to slide: therethrough. The lower portion 40b is provided with an arch-like cut-off portion 401 formed in the bottom thereof. The body member 40 has an internal space where said sliding member 42 slidingly moves. The sliding member 42 is provided with an opening 423 in the upper part thereof. A suspension plate 424 is inserted through said twin windows 404 with said opening 423 thereinbetween so that the sliding member 42 is suspended in the internal space. The sliding member 42 and the suspension plate 424 are given limited freedom to slidingly move in the twin windows 404 and the hanger portion 422 correspondingly slides into and out of the cut-off portion 401.

The cable (X) hanging from the hanger portion 422 in the cut-off portion 401 by means of a suspension member 80, as shown in FIG. 8, is released onto the cable receiver below when the activation function of the body member 40 is triggered and the hanger portion 422 is withdrawn from the cut-off portion 401 as shown in FIG. 9.

Figure 10:
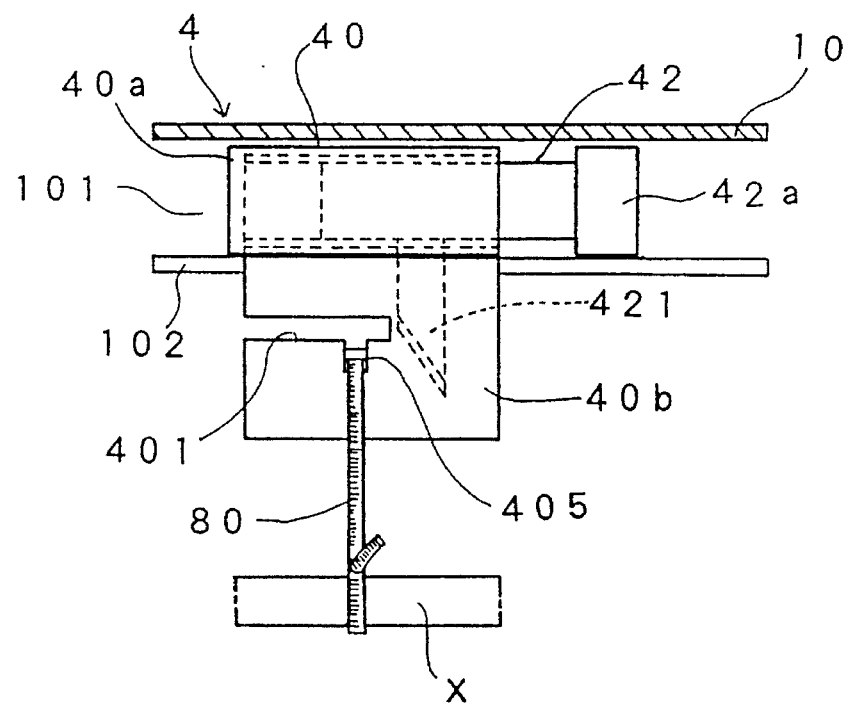
FIG. 10 is a side view of another embodiment suspension device according to the present invention showing a cable suspended from the suspension device (Embodiment D-3)
Figure 11:
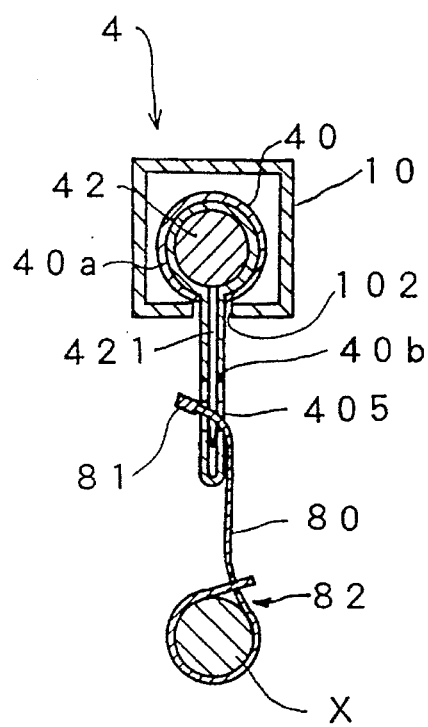
FIG. 11 is a cross-sectional view of the suspension device of FIG. 10.
Figure 12:
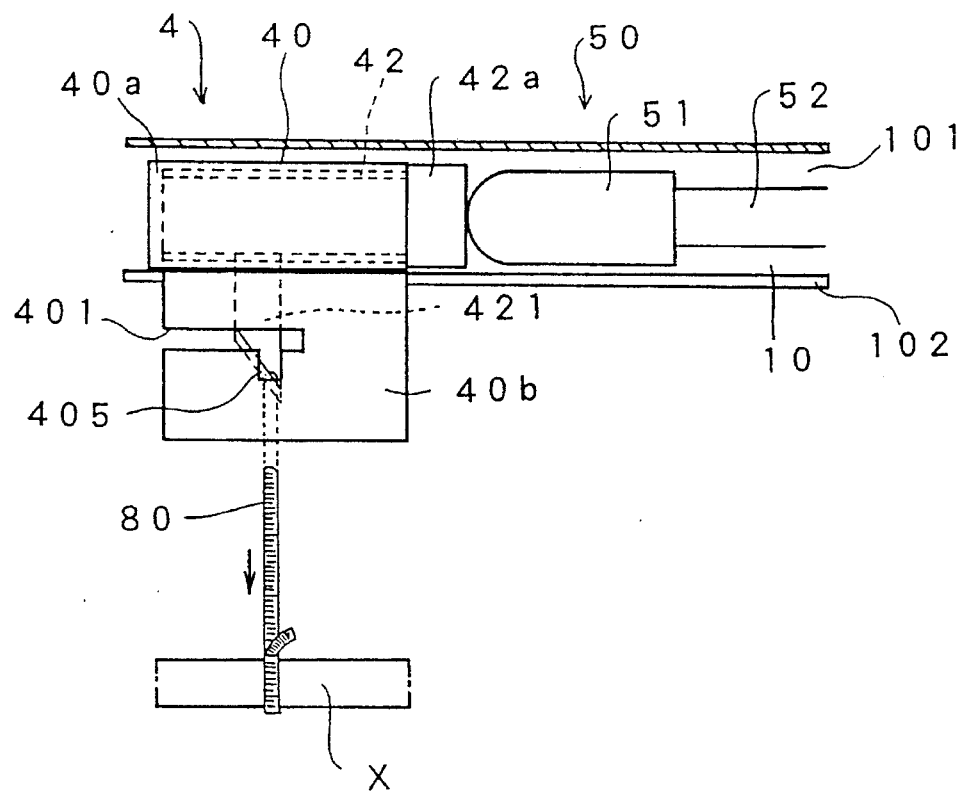
FIG. 12 is a side view of the suspension device of FIG. 10 showing a state of the release function.

EMBODIMENT D-3:

FIGS. 10 to 12 show another suspension device 4 according to the present invention, comprising a body member 40 to be held in the passage lot of the chute 10, a sliding member 42 which can move relative to said main body member 40 and a blade member 421 provided on said sliding member 42 such that the blade portion of the blade member 421 faces slantingly downward.

The body member 40 bas the upper portion 40a which travels within the passage 101 and the lower portion 40b which travels outside the passage 101. The upper portion 40a is provided with a space where the sliding member 42 can slidingly move. The lower portion 40b is provided with a cut-off portion 401 extending horizontally, where a suspension member 80 is hung by means of a cavity portion 405 provided in the cut-off portion 401 so that the suspension member 80 does not slide off the cut-off portion 401. The lower portion 40b is also provided with space for said blade member 421 to move slidingly through. The blade portion of the blade member 421 can move across the cut-off portion 401 and the cavity portion 404 to cut off the suspension member 80 in the cavity portion 404 so that the cable (X) hanging from the suspension member 80 is released onto the cable receiver below. The sliding member 42 has a head portion. 42a, which is to be pressed in order to activate the releasing function of the suspension device 4.

A cable (X) is suspended in the manner shown in FIGS. 10 and 11 by the suspension device 4 and forwarded through the passage 101 of the chute 10 as the suspension device 4 moves forward in the passage 101. And as shown in FIG. 12, the cable (X) is released when the head portion 42a is pressed by a press means 50 and the blade member 421 cuts off the suspension member 80 in the cavity portion 405.

The suspension member 80 need be strong enough to suspend a portion of a cable (X) and also need be easily cut by the blade member 421. A nylon string of all appropriate can preferredly be used. The suspension member 80 is preferably provided with a stoppage 81 so that the suspension member 80 can be easily hung in the cavity portion 405. Said stoppage 81 can be prepared by making the end of the suspension member 80 bigger in diameter so that the stoppage 81 will not slip off the cavity portion 405. On the other end of the suspension member 80, a fastenable loop 82 can be provided to suspend a cable (X) by slipping the cable (X) through the loop 82 and fastening the cable (X) therein in a manner as shown in FIG. 11.

Figure 14:
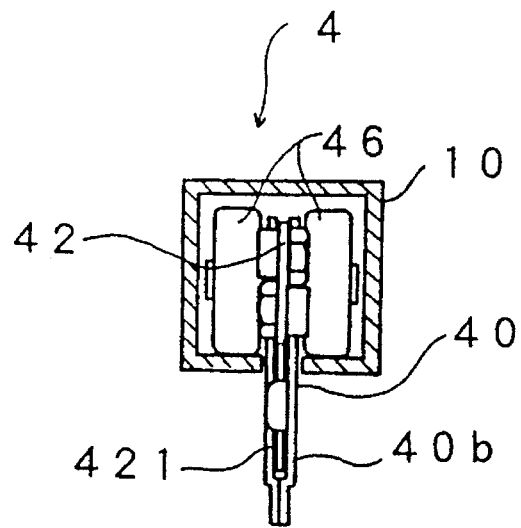

EMBODIMENT D-4:

Another suspension device 4 is shown in FIGS. 13 and 14, comprising a body member 40 and a sliding member 42 having a blade member 421. Unlike the body members 40 described in the embodiments D-1 through D-3, the body member 40 in this embodiment comprises two separate plate members fixed together with a boll means 406 and is provided with space between said plate members where the sliding member 42 having the blade member 421 slidingly moves. The upper portion 40a of the body member 40 is provided with two pairs of wheel members 46 which rollingly go through the passage 101 of the chute 10. The lower portion 40b of the body member 40 sticks out of the slit 102 of the chute 10. The sliding member 42 is also provided with bolts 425 and 426 near its head portion 42a to facilitate a reliable pressing of the sliding member 42 by a pressing means such as the press means 50 described previously. This embodiment suspension device 4 functions nearly identically with the suspension device of Embodiment D-3 and releases the cable (X) onto the cable receiver below.

EMBODIMENT D-5:

Another suspension device 4 is shown in FIGS. 15 and 16, comprising a body member 40 and a sliding member 42 having a hanger portion 422. The sliding member 42 having the hanger portion 422 can slidingly move in the space created inside the body member 40. The hanger portion 422 goes in to the cut-off portion 401 prepared as shown in FIG. 15 and retreats from the cut-off portion 401 as shown in FIG. 16. The upper portion 40a of the body member 40 is provided with two pairs of wheel members 46 which support the suspension device 4 in the passage 101 and rollingly go therethrough. The cable (X) hanging from the hanger portion 422 by means of a suspension member 80 can be released onto the cable receiver by means of pressing the head portion 42a of the sliding member 40 with a press means 50. Then the hanger portion 422 retreats from the cut-off portion 401 and the suspension member 80 comes off the hanger portion 422 slidingly as shown in FIG. 16.

EMBODIMENT D-6:

FIGS. 17 and 18 show still another suspension device 4, comprising a body member 40, a sliding member 42 having a teeth portion 427 and a turnable gear member 45 which engages with the teeth portion 427. The gear member 45 is provided with a cut portion whose shape is a combination of an opening corresponding to the cut-off portion 401 provided at the bottom of the lower portion 40b and an opening extending from said opening approximately at a right angle as shown in FIGS. 17 and 18. The portion in the gear member 45 formed by the latter opening provides the suspension portion 451. The suspension portion 451 goes into and comes out of the cut-off portion 401. The cable (X) hanging from the suspension portion 451 by means of a suspension member is released when a press means 50 presses the head portion 42a of the upper portion 40a of the body member 40 and turns the gear member 45 as shown in FIG. 18.

EMBODIMENT D-7:

Still another suspension device 4 is shown in FIGS. 19 and 20, comprising body member 40 having two pairs of wheel members 46 in the upper portion 40a of the body member 40. The lower portion 40b of the body member 40 is provided with a cut-off portion 401 and a turnable hanger 407 which goes across the cut-off portion 401 to suspend a suspension member 80 as shown in FIG. 19. The suspension device 4 is also provided with an electric power circuit means which can activate the release function of the suspension device 4. The circuit means comprises a switch, a power means 411, a solenoid 412 and a plunger means 413. The plunger means 413 hooks the hanger 407 so that the hanger 407 is hung across the cut-off portion 401 and suspends the suspension member 80 as shown in FIG. 19. When the switching means 41 provided around the lead of the upper portion 40a is pressed by a press means, it activates the switch and turns on the power means 411 provided in said power circuit means and the solenoid means 412 in the circuit means pulls the plunger means 413 so that the plunger means 413 retreats and unhook the hanger 407. The hanger 407 then turns downward, releasing the suspension member 80 and the cable (X) suspended thereon as shown in FIG. 20. The power means 411, the solenoid 412 and the plunger means 413 used in the circuit means can be any appropriate conventional ones.

In the foregoing, several embodiments of suspension devices 4 according to the present, invention are shown, however, suspension devices 4 according to the present invention can take other forms as well. A suspension device 4 according to the present invention can chiefly comprise a suspensions means, a release means and an activation means for activating the release means. The suspension devices according to the present invention can be used to lay not only cables and wires but also flexible type of pipes and hoses and other soft-type linear products.

In the following are described rail means 1 to be used for the suspension devices 4 according to the present invention.

A suspension device 4 is to be movably held by a rail means 1 according to the present invention. The rail means 1 may comprise, as shown in FIG. 3, a chute 10 having a passage 101 which bas a pair or support floors 111 for holding the wheel members 46, sliding bars 47 or the like of the suspension devices 4 of the present invention. A rail means 1 can take another form as well, such as the one shown in FIGS. 21 to 27. It can also be like the one shown in FIG. 54 for a particular suspension device according to the present invention.

The rail means 1 according to the present invention shown in FIG. 21 comprises an elongated plate body 11 and a wing-like support floors 111 protruding both horizontally from the bottom side of the plate body 11. In this embodiment rail means 1, a suspension device 4 having two pairs of wheel members 46 and four wheel supports 462 is hung with said wheel members 46 on said support floors 111 as shown in FIG. 21.

The rail means 1 according to the present invention shown in FIGS. 22 and 23 comprises a passage 101 where the upper portion 40a of a suspension device 4 goes through and a support floor 111 horizontally protruding from both sides from each bottom side edge of the passage 101. A slit 102 is provided between said support floors 111. The support floors 111 hold the wheel members 46 of the suspension device 4 as shown in FIG. 23 with the upper portion 40a inside the passage 101 and the lower portion 40b hanging out of the slit 102.

FIGS. 24 and 25 show another rail means 1 according to the present invention, comprising an elongated cylindrical member 121 and a correspondingly elongated plate portion 12 protruding upward from the cylindrical member 121 as shown in FIG. 24. A suspension device 4 having wheel members which are slantingly attached to the body member 40 with adjustedly modified axles 461 as shown in FIG. 25 moves with the wheel members 46 on the cylindrical member 121, which rollingly move on the cylindrical member 121, while suspending a portion of a cable (X).

The rail means 1 according to the present invention shown in FIGS. 26 and 27 is a modified version of the rail means 1 of FIG. 21. The wing-like support floors 111 are slantingly attached to the plate body 11 at the bottom thereof. A suspension device 4 having slantingly attached wheel members 46 moves as the wheel members 46 roll on the support floors 111 as shown in FIG. 27.

There should be a number of variations of such rail means 1 according to the present invention. A rail means 1 according to the present invention can chiefly comprise a holding means whereby a suspension device 4 according to the present invention is held and moves in the cable laying route.

Here also, not only cables but also other soft-type linear products can be laid using suspension devices 4 and a rail means 1 according to the present invention.

In the following are described embodiments of cabling apparatuses according to the present invention.

A cabling apparatus according to the present invention usually comprises a rail means 1, suspension devices 4, a trigger means 3 and a dragging device 2, whereas said trigger means 3 triggers the release function of the suspension device 4 and said dragging device 2 carries the suspension devices 4 through the cable laying route. The dragging operation and the release activating operation can be done either manually or automatically using an automatical device or by a combination thereof. Depending upon circumstances or by choice, a cable laying operation does not require use of a dragging device 2 or a trigger means 3.
EMBODIMENT A-1:

FIGS. 28 through 30 show a cabling apparatus and its components according to the present invention. The apparatus comprises a chute 10 as a rail means 1, a plurality of suspension devices 4, a dragging means 30 as a dragging device 2 and a press means 50 as a trigger means 3. Said chute 10, said suspension device 4 and said press means 50 are shown in FIG. 28. Said press means 50 is also shown in FIG. 29. FIG. 30 shows the chute 10, the suspension device 4 and the dragging means 30 and FIG. 31 shows the dragging means 30 alone.

The chute 10 is provided with a passage 101 and a longitudinal slit 102 which runs throughout the passage 101. The upper portion 40a of the suspension device 4 goes through the passage 101 and the lower portion 40b of the suspension device 40 hangs out from the slit. 102. The passage 101 holds the suspension device 4. The dragging means 30 and the press means 50 also go through the passage 101. The passage 101 need not be circular in cross-section. It can be square, triangular or another shape in cross-section as long as it holds suspension devices 40, a dragging means 30 and a press means 50 and provides them with smooth passage therethrough. In this embodiment, the slit 102 running along the passage 101 provides connection between the dragging means 30 and a cable (X) which is attached to a suspension member 80 hanging from the suspension device 4 as shown in FIG. 30.

Suspension devices 4 used in this embodiment apparatus are of the type shown in FIG. 10, comprising a body member 40, a sliding member 42 and a blade member 421. The upper portion 40a of the suspension devicer 40 moves inside the passage 101 and the lower portion 40b of the suspension device 40 moves outside the passage 101 along the slit 102. The lower portion 40b is provided with a cut-off portion 401, and a suspension member 80 is hung in the cavity portion 405 provided in the cut-off portion 401. The blade member 421 provided in the sliding member 42 moves in the space provided inside the lower portion 40b into the cavity portion 405 and cuts off the suspension member 80 to release the cable (x) when the sliding member 42 is pushed by a press means 50.

As shown in FIGS. 30 and 31, a dragging device 2 is used to draw a cable (X) through a rail means 1. In this embodiment, the dragging device 2 comprises a shuttle head 31, and the dragging means 30 comprising a rope 32. The shuttle head 31 may preferredly be made of hard type synthetic resin. It is also preferred to form the shuttle head 31 like a bullet head so that it can go forward smoothly through the passage 101. The shuttle head 31 is provided with a tongue member 312 having a hole 313 as shown in FIG. 31. The tongue member 312 protrudes from the slit 102. A connection string 314 connects the hole 313 and a cable (X) so that the cable (X) is drawn by the dragging means 30. The rope 32 should be sufficiently hard so that the rope 32 can be sent forward little by little by means of pushing the rope 32 with hands through the chute 10 together with the shuttle head 31 attached on the head portion thereof. The rope 32 should also be strong enough so that the rope 32 can drag through the chute 10 the cable (X) which is connected to the suspension devices 4 with the suspension members 80. Such a rope 32 may be made of steel, synthetic resin, or other like strong materials. It is preferred that such a rope 32 is as light as possible. The shuttle head 31 and the rope 32 may be prepared as a single unit. It is possible to provide a connecting means or a hole directly on the shuttle head 31 without providing the tongue member 312 or the hole 313. The connecting hole 313 can be replaced by any other appropriate connecting means as well.

As shown in FIGS. 28 and 29, the trigger means 3 comprises a press means 50 having a head portion 51 and a rope member 52. The head portion 51 is inserted into the passage 101 of a chute 10 and presses the head portion 42a of the sliding member 42 of the suspension device 4. The rope member 52 need be sufficiently hard and strong. The head portion 51, located at the head end of the rope member 52 presses the head portion 42a and the blade member 421 provided in the sliding member 42 of the suspension device 4, moves into the cut-off portion 401 and the cavity portion 405, cutting off the suspension member 80 and releasing the cable (X) connected to the suspension member 80 onto the cable receiver. Such a press means 50 may be a dragging device 2 already described hereinabove.

EMBODIMENT A-2:

FIGS. 32 and 33 show another embodiment of the cabling apparatus according to the present invention, comprising a rail means 1, a plurality of suspension devices 4 and a dragger device 60 as a trigger means 3, whereas said rail means 1 comprises a chute 10 having a passage 101 and a longitudinal slit 102 running through the passage 101.

The suspension device 4 comprises a body member 40 and a sliding member 42 having a hanger portion 422. The body member 40 comprises the tipper portion 40a and the lower portion 40b. The upper portion 40a goes through the passage 101 and the lower portion 40b protrudes from the slit 102 prepared in the passage 101. The lower portion 40b provides space for the hanger portion 422 to move therein, and the lower portion 40b is provided with a cut-off portion 401 for suspending a suspension member 80 therein. The lower portion 40b is also provided with a through hole 408 for passing a drag string 62 therethrough. The location of the through hole 408 can be another spot other than that shown in FIGS. 32 and 33 as long as the location does not hinder the cable laying operation. The through hole 408 may be replaced by another means such as a hook.

The sliding member 42 is slidably housed within the space created inside the upper portion 40a and the lower portion 40b of the suspension device 40. The suspension member 80 tied a cable (X) is suspended by the hanger portion 422 as shown in FIG. 32. The suspension member 80 is released when the head portion 42a of the sliding member 42 is pressed by the dragger device 60 which is pulled by means of the drag string 62 as shown in FIG. 33.

The dragger device 60 comprises a body portion 61 and a drag string 62. The body portion 61 comprises a sliding portion 611 and a tongue portion 612, whereas the sliding portion 611 travels through the passage 101 of the chute 10 and the tongue portion 612 travels along the slit 12 sticking out therefrom. The tongue portion 612 is provided with a drag bole 613 for connecting the drag string 62. The drag string 62 need be sufficiently strong in order to pull the dragger device 60 through the passage 101 and to effectively trigger the release function of the suspension devices 4. The drag string 62 does not necessarily go through the through hole 408.

In this embodiment, the dragging means 30 as shown in FIG. 31 can be used as the dragger device 60.

EMBODIMENT A-3:

Another cable laying apparatus according to the present invention is shown in FIGS. 34 and 35. In this embodiment, suspension devices 4 are also used as a trigger means 3. The sliding member 42 of each suspension device 4 seen on the right in FIG. 34 is connected with a pulling string 48 around the tail portion thereof. As the pulling string 48 is pulled toward the left, the sliding member 42 and its blade member 421 of the suspension device 4 on the right move left and the blade member 421 cuts off the suspension member 80 in the cavity portion 405 thereof to release the corresponding portion of the cable (X). When the sliding member 42 of the suspension device 40 on the right hits the left side of the upper portion 40a of the body member 40, the suspension device 4 on the right starts to move left pulled by the pulling string 48 through the passage 101 of the chute 10. Then the suspension device 4 on the right presses the head portion 42a of the sliding member 42 of the suspension device 4 on the left and the blade member 421 of the sliding member 42 thereof cuts off the suspension member 80 thereof to release the corresponding portion of the cable (X). This process repeats until all the suspension devices 4 on the left in the chute 10 release the cable (X) completely. The pulling string 48 goes through the sliding members 42 of the suspension devices 4 resting successively in the passage 101 on the left in FIG. 34 (not wholly shown) to facilitate the release operation of all the suspension devices 4 in the passage 101.

The dragging device 2 used in this embodiment may be the dragging means 30 as shown in FIG. 31.

EMBODIMENT A-4:

FIGS. 36 and 37 show another embodiment of the cable laying apparatus according to the present invention. In this embodiment, attachment strings 70 which are connected between the suspension devices 4 are used as a trigger means 3 as shown in FIG. 36.

Each suspension device 4 in this embodiment has a body member 40, a cover member 49 and a sliding member 42, whereas said cover member 49 is to cover the upper portion 40a of the body member 40. The sliding member 42 is provided with a horizontally extending guide aperture 409 on each side thereof and the cover member 49 is provided with a guide window 493 corresponding to said guide aperture 409 on each side thereof. The guide windows 493 are to engage with the guide apertures 409 with a connecter pin 492 inserted therethrough and the hole provided in the sliding member 42, providing the sliding member 42 with some freedom of movement within the apertures 409 and windows 493 as can be seen in FIG. 37. The upper portion 40a of the body member 40 is supported by the chute 10 and moves through the passage 101 of the chute 10. The lower portion 40b of the body member 40 protrudes from the slit 102. The lower portion 40b is provided with space which facilitates the movement of the hanger portion 422. The cut-off portion 401 formed in the body member 40 facilitates the suspension of the suspension member 80. The head side (right) of the cover member 49 and the tail side (left) of the sliding member 42 are provided with connecting hooks 491 and 428 respectively as shown in FIG. 37. The attachment strings 70 are individually connected to the hooks 491 and 428 as shown in FIG. 37. The string 70 can be any string as long as it is sufficiently strong and can be tied to the connecting hooks 428 and 491 easily. It does not need to be hard.

The sliding member 42 is slidably housed in the space provided within the upper portion 40a of the body member 40. The hanger portion 422 is slidably housed in the lower portion 40b and can go into the cut-off portion 401. A suspension member 80 is hung from the hanger portion 422 in the cut-off portion 401 as shown in FIG. 36.

As FIG. 36 shows, when the string 70 on the right is pulled toward right, the cover member 49 and the body member 40 are pulled right, however, the sliding member 42 holds its position since it is connected with a weighting cable (X) held by the suspension member 80 until the connecter pin 492 comes to the tail (left) end of the aperture 409 and that of the window 493. Then, the hanger portion 422 relatively moves backward out of the cut-off portion 401 and releases the suspension member 80 together with the cable (X) held thereby. When the movement of the cover member 49 and the body member 40 stops, the string 70 connected on the sliding member 42 on the left side thereof pulls the cover member 49 and the body member 40 of the suspension device 4 together with the sliding member 42 toward left. By repeating this process until all the suspension devices resting in the passage 101 in succession on the left release the cable completely down onto the receiver.

EMBODIMENT A-5:

FIGS. 38 and 39 show another embodiment of the cable laying apparatus according to the present invention. A string 70 is used here as a trigger means 3 to activate the release function of the suspension devices 4.

The suspension device 4 of this embodiment has a sliding member 42 whose movement is limited by the guide apertures 409 provided in the upper portion 40a of the body member 40 and the guide windows 493 provided in the cover member 49, which engage with each other by the connecter pin 492. The sliding member 42 is provided with a blade member 421. A string 70 is connected at one end to the cover member 49 by means of a connecting hook 491 at the head (right) of the cover member 49 and another string 70 is connected at one end to the sliding member 42 by means of a connecting hook 428 at the tail (left). The lower portion 40b of the body member 40 is provided with a cut-off portion 401 having a cavity portion 405 for suspending a suspension member 80. The blade member 421 enters the cavity portion 405 to cut off the suspension member 80 so that the cable (X) tied to the suspension member 80 falls onto the receiver.

The dragging device 2 used in Embodiments A-4 and A-5 can be the the dragging means 30 shown in FIG. 31.

Throughout Embodiments A-1 to A-5, a rail means 1 comprising a chute 10 having a passage 101 and a slit 102 is used. The rail means 1 to be used therefor can alternatively be any of those shown in FIGS. 21, 22, 24 and 26. The ways the suspension devices 4 are held by those rail means 1 are as shown in FIGS. 21, 23, 24 and 27. The dragging device 2 and the trigger means 3 are to be appropriately selected according to the rail means 1 used. For example, in case of the rail means 1 shown in FIG. 21, the dragging means 30 shown in FIG. 40 may be used, whereas the dragging means 30 comprises an engagement portion 332 which engages with the support floors 111 of the rail plate body 11 shown in FIG. 41. The dragging means 30 also has a connecter hole 331 in the head portion thereof such as shown in FIG. 40. A dragging device 2 comprising wheel members 342 and a connecting hole 341 as shown in FIG. 41 can also be used as a dragging means 30 having a connecter hole 331. The wheel members 342 roll on the wing-like support floors 111. A press means 50 having an engaging portion 53 as shown in FIG. 42 can be used as a trigger means 3. Or a press means 50 having wheel members 54 as shown in FIG. 43 can be used. Or still, a dragger device 60 comprising wheel members 614, a body portion 61 and a drag string 62 as shown in FIG. 44 can be used.

A rail means 1 to be used as described so far can be installed along a cable route by any appropriate conventional manner, either straight or winding as required. When a cable is to be laid over a long span, then a plurality of such rail means 1 are connectedly installed. They can be connected, for example as shown in FIGS. 45 and 46, by using pins 151, pin receivers 152 and holding covers 153.

In the above, the rails 1 which are to hold suspension devices 4 have been described as conducting means conducting therein a dragging means 30 used as a dragging device 2, a press means 50 and a dragger device 60 which is used as a trigger means 3, however, such a conducting means can be prepared separately from a rail means 1. FIGS. 47 to 49 show such an apparatus having a conductor 1a inside (FIGS. 47 and 48) and a conductor 1a outside (FIG. 49).

EMBODIMENT A-6:

Another cabling apparatus according to the present invention is described below, comprising an automatic device 5.

FIGS. 50 through 52 show such a cabling apparatus, comprising a chute 10 as a rail means 1, suspension devices 4 and an autorunner 20 as an automatic device 5.

The autorunner 20 is provided with four pairs of rollers 22 which roll on the passage 101 inside a chute 10 as shown in FIG. 51 such that the rollers 22 grab in cooperation the floors of the chute 10. The shaft means 231 of the motor means 23 installed in the main body 21 engages with the roller shaft 221 of the rollers 22 inside the passage 101 by means of a belt 24. The motor means 23 is powered by a power source 25 installed on the main body 21. The main body 21 is provided with a hole 211 for connecting with a suspension device 4 by means of a connecter string 71. The main body 21 is also provided with an edge portion 21a protruding into the passage 101 in parallel thereto, which is to press the head portion 42a of the sliding member 42 and trigger the release function of the suspension device 4.

The suspension device 4 used in this embodiment is the one shown in FIG. 10 or FIG. 28, chiefly comprising a body member 40, a sliding member 42 and a blade member 421.

As shown in FIG. 50, a cable (X) is hung from the suspension device 4, and the autorunner 20 moves right (in this case) in the passage 101 pulling the suspension device 4 which is connected with the autorunner 20 with a connecter string 71. The suspension device 4 may be connected with another suspension device 4 on its left (not shown) with any suitable connecting means, which may be connected with another suspension device 4. As many suspension devices 4 as required, usually depending upon the length of the cable route in an operation, are connected with one after another in this manner. After the cable (X) is laid under the passage 101, the autorunner 20 backs up to the left and triggers the release function of the suspension device 4 on its immediate left, which in turn triggers the release function of the suspension device 4 on its immediate left, repeating same until the leftest suspension device 4. The movement of the autorunner 20 forward and backward can be controlled manually or by remote control means.

FIG. 53 shows another type of the autorunner 20, comprising an assistant roller 26 or rollers 26. The assistant roller 26 runs on a guide rail 16 prepared beside the passage 101 as shown in FIG. 53, facilitating a stabler and smoother movement of the autorunner 20 as well as increasing resistance against slippage of the autorunner 20.

FIG. 54 shows another autorunner 20 according to the present invention. The autorunner 20 comprising rollers 22 having teeth runs on toothed rails 112.

The automatic device 5 such as the autorunner 20 may run on another rail (not shown) prepared apart from the rail means 1. A cable laying apparatus according to the present invention can comprise a rail means as shown in FIG. 21, FIG. 22 or FIG. 24, with an adjustment thereto, such as providing the automatic device 5 with one of the traveling/holding functions of the suspension devices 4 shown in FIGS. 21, 23, 25 and 27. It is also possible to provide a cable laying apparatus of the present invention with the suspension devices 4 as shown in FIGS. 3, 7, 13, 15, 17, 21, 23, 25 or 27.

A cable (X) is automatically drawn through the cable laying route by means of connecting an automatic device 5 and suspension devices 4 by means of strings or the like, or by means of directly connecting the automatic device 5 and the cable and running the automatic device 5 on a rain means 1 through the cable route. The cable (X) drawn through the cable route is released by running the automatic device 5 backward on the rail means 1 and having the automatic device 5 trigger the release function of the suspension devices 4 one by one. In this manner the cable laying operation is done nearly automatically.

When appropriate, the automatic device 5 can be provided with only either a dragging function or a triggering function. It is possible to select one for the device 5 between those two functions, either drawing a cable into the cable laying route or triggering the release function of the suspension devices 4. The remaining one then can be followed up manually.

Using the above described apparatuses selectively according to the circumstances, not only a cable but also other types of elastic linear products or materials can be easily laid on the cable receivers installed, either straight or windingly, along the cable laying route in various places without damaging the cables to be newly laid or the cables already laid in the cable receivers.

Hereunder, some cable laying methods are described in order to provide a better understanding of the present invention.

FIGS. 55 to 60 show a cable laying method using the cable laying apparatus shown in FIGS. 28 to 30. This method chiefly comprises the step of dragging a cable (X) into a chute 10 with the assistance of suspension devices 4 and the step of releasing the cable (X) onto the receiver using the trigger means 3 provided the suspension devices 4.

As shown in FIG. 55, the chute 10 is suspended from the ceiling wall (W) along the route of the cable receiver 100 by means, such as bolts (B). A plurality of cable receiving lines may be prepared using as many cable receivers 100 as required such that many cables can be laid in the cable laying route without getting crowded.

The dragging means 30 is first driven by hand into the chute 10 from a starting point (on the right) as can be seen in FIG. 55 toward an ending point (on the left). A "starting point" just means a point, of the chute 10 and an "ending point" means another point of the chute 10.

As FIG. 56 shows, the dragging means 30 is connected with a cable (X) by a connecting means at the end point. The cable (X) is suspended by a plurality of suspension devices 4 cooperatively as shown in FIG. 57 so that no portion of the cable (X) touches the cable receiver 100 below or any cable thereon (not shown).

The dragging means 30 is pulled toward the starting point so that the cable (X) suspended by the suspension devices 4 laid over the cable receiver 100 as shown in FIG. 57. The dragging means 30 is then detached from the cable (X) at the starting point.

Next, as shown in FIG. 58, a press means 50 is sent into the chute 10 from the starting point and it presses the right hand most suspension device 4 and triggers the release function thereof. The cable (X) completely falls onto the cable receiver 100 when all the release functions of the suspension devices 4 have been activated one after another by the pressing with the press means 50 as shown in FIG. 59. As many cables (X) as required can be laid on the cable receiver 100 by repeating this process.

The cable receiver 100 used in the above method can be one of such receivers as shown in FIGS 86, 87, 88 and 89, 90 and 91. A chute 10 can be installed another way, such as attaching the chute 10 directly to such a cable receiver 100, or installing it on the side wall as desired in an appropriate conventional manner.

The above introduced method uses a step of dragging a cable (X) through a chute 10 with a dragging means 30. Another cable dragging method using the suspension devices 4 and apparatuses according to the present invention is introduced below using a pilot rope 90. This method is suitable for laying a heavier cable (X).

This method comprises steps of:

a) installing a chute 10 along the cable laying route (FIG. 55);

b) sending a dragging means 30 into the chute 10 from a starting point to an ending point (FIG. 55);

c) connecting a pilot rope 90 to the dragging means 30 at the ending point (FIG. 61);

d) drawing back the dragging means 30 to the starting point so that the pilot rope 90 laid over the cable receiver 100;

e) releasing the pilot rope 90 from the dragging means 30 at the starting point (FIG. 62);

f) attaching at appropriate intervals suspension devices 4 one by one to the cable (X) at the ending point (FIG. 63);

g) connecting the cable (X) with the pilot rope 90 at the ending point (FIG. 63);

h) drawing the pilot rope 90 toward the starting point together with the cable (X) and the suspension devices 4 hanging the cable (X) and untying the pilot rope 90 from the cable (X) at the starting point (FIG. 64);

i) sending a press means 50 into the chute 10 from the starting point (FIG. 58); and j) releasing the cable (X) from all the suspension devices 4 so that the cable (X) drops onto the receiver 100 (FIG. 59).

It should be noted that said starting point and said ending point can be reversed wherever appropriate or desired.

The pilot rope 90 can be laid in the cable route alternatively by first connecting the pilot rope 90 with the dragging means 50 and then sending the dragging means 50 from the starting point through the chute 10 to the ending point, as shown in FIG. 65, instead of the process described above. The above described steps can be modified in their order wherever possible. The pilot rope 90 used in this method need not be so hard, however, it need be sufficiently strong so that it can bear the dragging of a rather heavy cable when the rope 90 is pulled with a dragging machine.

In the following is described another cable laying method using the apparatus shown in FIGS. 32 and 33. FIGS. 66 through 71 show the method.

As shown in FIG. 66, a chute 10 is installed along the cable laying route. Alternatively it is possible to install a plurality of chutes 10 in a plurality of lines when many cables are to be laid. A dragging means 30 is sent into the chute 10 from a starting point (on the left in the figure).

As shown in FIG. 67, a cable (X) is connected to the dragging means cans 30 at an ending point (on the right) and suspended at the ending point substantially evenly by suspension devices 4 using suspension members 80. The suspension members 4 are inserted in the chute 10 one after another after a dragger device 60 is inserted thereinto, which is connected with the leftest suspension device 4 with a string. All the suspension devices 4 are connected with one another with drag string means 62.

As shown in FIG. 68, the dragging means 30 is pulled toward the starting point until the cable (X) is laid through the cable laying route. As can be seen in FIG. 69, the drag string 62 is then pulled toward the ending point to trigger the release function of all the suspension devices 4 one after another and the cable (X) then falls on the cable receiver in 100 the route portion by portion as shown in FIGS. 70 and 71.

The dragger device 60 can be inserted into the chute 10 after all the suspension devices 4 have been inserted therein. In such a case, the suspension devices 4 are inserted rightside left and the dragger device 60 is pulled from the starting point.

A pilot rope 90 can be laid first through the route by the dragging means 30 in order to be connected with the cable (X) so that the pilot rope 90 can be pulled instead of the dragging means 30 in order to lay the cable (X) in the route.

Another laying method according to the present invention is described in the following using the apparatus shown in FIG. 36. FIGS. 72 through 77 show the method.

As shown in FIG. 72, a chute 10 is installed along the cable receiver 100. A plurality of such chutes 10 can be installed in a plurality of lines when required or desired.

A dragging means 30 is inserted into the chute 10 at a starting point on the left (FIG. 72) and sent forward through the chute 10 toward an ending point (big 73). A cable (X) is attached to a plurality of suspension devices 4 at appropriate intervals by means of suspension members 80 at the ending point on the right. The suspension members 4 can be priorly connected with strings 70 as shown in FIGS. 72 and 73. The process order of the cable laying operation can be modified as suited.

The dragging means 30 is then pulled back to the starting point together with the suspension devices 4 and the cable (X) as shown in FIG. 74.

The cable (X) is released by means of pulling the string 70 toward the right in FIG. 75, which eventually triggers the release function of all the suspension devices 4 one after another as shown in FIGS. 75 and 76 until all the suspension members 80 are cut off (FIG. 77) and release the cable (X) completely onto the cable receiver 100 below.

The string 70 can be pulled toward the starting point if the release function of the suspension devices 4 are made so as to be triggered that way. The operation described above can utilize a pilot rope 90 as described previously in relation to FIGS. 61 to 65.

Another cable laying method according to the present invention is described below using the apparatus shown in FIGS. 50 to 52. FIGS. 78 to 81 show the method.

As shown in FIG. 78, a chute 10 is installed along the cable receiver 100. A plurality of such chutes 1B can be installed as required or desired.

An autorunner 20 is connected with a cable (X) by the head portion of the cable (X) and a plurality of the suspension devices 4 are attached to the cable (X) to evenly suspend the cable (X) using suspension members 80. The autorunner 20 draws the cable (X) and the suspension devices 4 as the autorunner 20 runs through the chute 10 from a starting point to an ending point as shown in FIG. 79.

The autorunner 20 goes back to the starting point when the cable (X) has been laid over the cable receiver 100 and it triggers all the release means of the suspension devices 4 one after another to completely release the cable (X) onto the receiver 100 below as shown in FIG. 81.

A pilot rope 90 can be first laid in the route by the autorunner 20 and then the pilot rope 90 can be utilized to pull and lay the cable (X) over the cable receiver 100 as previously described.

Still another cable laying method is described below using the suspension devices 4 shown in FIG. 21. This method does not require the use of the dragging means 30. FIGS. 82 to 85 show the method.

A plate rail body 11 is installed along the cable receiver 100. A plurality of such rail bodies 11 can be utilized in a line or in parallel if necessary or desired.

The rope 72 is first laid over the cable receiver 100 in the laying route and is attached to the foremost suspension device 4. Said suspension device 4 suspends the head portion of a cable (X) by means of a suspension member 80. A plurality of suspension devices 4 are then attached to the cable (X) at appropriate intervals by means of suspension members-80 as shown in FIG. 82.

The rope 72 is pulled toward the ending point (left) and the suspension devices 4 and the cable (X) are laid over the cable receiver 100 through the route as shown in FIG. 83.

As FIG. 84 shows, a press means 50 is sent along the rail body 11 from the ending point and triggers the release function of the suspension devices 4 one by one, and the cable (X) is released from the suspension devices 4 onto the cable receiver 100 portion by portion.

As described in the above, the present invention facilitates an easy cable laying operation even over a long and/or winding route, even when there exit cables previously laid in the cable laying route, preventing damages to the cable to be newly laid or the cables already laid on the receiver 100.

As repeatedly mentioned in the foregoing, the present invention provides laying of not only cables but also other soft linear materials such as wires, flexible water pipes and gas pipes and hoses.

The invention may also be embodied in other specific forms without departing from the scope or essential characteristics thereof. The present embodiments are therefore to be considered in all aspects as illustrative and not restrictive, the scope of the invention being indicated by the appended claims rather than by the foregoing description, and there is no intention to exclude any equivalence thereof. Hence, it is recognized that various modifications are possible within the scope of the present invention as claimed.

What is claimed is:

1. A suspension device movably mounted on rail means provided above and along a laying route for laying a linear material along said laying route, comprising:

suspension means for suspending said linear material;

release means including a face edge for releasing said linear material from said suspension means; and activation means for activating said release means by a collision of said face edge with another suspension device.

2. A suspension device of claim 1, wherein said suspension means is provided with movable hanging means for hanging said linear material and releasing same when activated by said activation means.

3. A suspension device of claim 1, wherein said suspension means is provided with hanging means for hanging said linear material with a string or the like and said release means is provided with cutting means for cutting said string and releasing said linear material when activated by said activation means.

4. A suspension device movably mounted on rail means provided above and along a laying route for laying a linear material along said laying route, comprising:

suspension means for suspending said linear material;

release means for releasing said linear material from said suspension means;

activation means for activating said release means; and a connecter string connected with another suspension device, and wherein said activation means activating said release means by a pull of said connecter string.

5. An apparatus for laying a linear material comprising:
rail means provided above and along a laying route; and
a plurality of suspension devices movably mounted at intervals on said rail means with said linear material hanging from said plurality of suspension devices; and each of said suspension devices comprising suspension means for suspending said linear material;
release means for releasing said linear material from said suspension means; and activation means for activating said release means by a collision with another suspension device.

6. An apparatus for laying a linear material comprising;
rail means provided above and along a laying route;
a plurality of suspension devices movably mounted at intervals on said rail means with said linear material hanging from said plurality of suspension devices; and each of said plurality of suspension devices comprising suspension means for suspending said linear material;
press means movably supported by said rail means,
release means for releasing said linear material from said suspension means; and activation means for activating said release means by a direct or indirect collision with said press means.

7. An apparatus for laying a linear material of claim 6, wherein said press means comprises rigid long body means movably provided on said rail means.

8. An apparatus for laying a linear material of claim 6, wherein said press means comprises a press body movably provided on said rail means, and string means connected to said press body.

9. An apparatus for laying a linear material of claim 6, wherein said press means comprises motored autorunner means which move on said rail means.

10. An apparatus for laying a linear material comprising:
rail means provided above and along the laying route;
a plurality of suspension devices movably mounted at intervals on said rail means with said linear material hanging from said plurality of suspension devices; and each of said plurality of suspension devices comprising suspension means for suspending said linear material;
string means for connecting said plurality of suspension devices,
release means for releasing said linear material from said suspension means; and activation means for activating said release means by a pull of said string means.

11. An apparatus for laying a linear material comprising;
chute means with a longitudinal slit provided above and along a laying route; and
a plurality of suspension devices movably mounted at intervals on said chute means with said linear material hanging from said plurality of suspension devices, and each of said plurality of suspension devices comprising suspension means for suspending said linear material;
release means for releasing said linear material from said suspension means; and activation means for activating said release means by a collision with another suspension device.

12. An apparatus for laying a linear material comprising;
chute means with a longitudinal slit provided above and along a laying route;
a plurality of suspension devices movably mounted at intervals on said chute means with said linear material hanging from said plurality of suspension devices; and each of said plurality of suspension devices comprising suspension means for suspending said linear material;
press means movably supported by said chute means,
release means for releasing said linear material from said suspension means; and activation means for activating said release means by a direct or indirect collision with said press means.

13. An apparatus for laying a linear material of claim 12, wherein said press means comprises flexible long body means with sufficient rigidity to move forward in said chute means when pushed forward.

14. An apparatus for laying a linear material of claim 12, wherein said press means comprises a press body movably held on said chute means, and a string means connected to said press body.

15. An apparatus for laying a linear material of claim 12, wherein said press means comprises motored autorunner means which moves on said chute means.

16. An apparatus for laying a linear material comprising;
chute means with a longitudinal slit provided above and along a laying route;
a plurality of suspension devices movably provided at intervals on said chute means with said linear material hanging from said plurality of suspension devices; and each of said plurality of suspension devices comprising suspension means for suspending said linear material;
a connecter string connecting said plurality of suspension devices,
release means for releasing said linear material from said suspension means; and activation means for activating said release means by a pull of said connecter string.

17. An apparatus for laying a linear material comprising:
chute means with a longitudinal slit provided above and along a laying route;
a plurality of suspension devices movably provided at intervals on said chute means with said linear material hanging from said plurality of suspension devices; and each of said plurality of suspension devices comprising suspension means for suspending said linear material;
flexible and tough drag means made passable in said chute means to pull along said chute means said linear material hanging from said plurality of suspension devices; and
press means movably provided on said chute means,
release means for releasing said linear material from said suspension means; and activation means for activating said release means by a direct or indirect collision with said press means.

18. An apparatus for laying a linear material of claim 17, wherein said press means comprises flexible long body means with sufficient rigidity to move forward in said chute means when pushed forward.

19. An apparatus for laying a linear material of claim 17, wherein said press means comprises a press body movably held on said chute means, and a string means connected to said press body.

20. An apparatus for laying a linear material of claim 17, wherein said press means comprises motored autorunner means which moves on said chute means.

21. An apparatus for laying a linear material of claim 17, wherein said press means also functioning as said drag means.

* * * * *